(12) United States Patent
Watanabe et al.

(10) Patent No.: US 9,915,815 B2
(45) Date of Patent: Mar. 13, 2018

(54) TOTAL INTERNAL REFLECTION LIGHT ILLUMINATION DEVICE

(71) Applicant: HAMAMATSU PHOTONICS K.K., Hamamatsu-shi, Shizuoka (JP)

(72) Inventors: Koyo Watanabe, Hamamatsu (JP); Naoya Matsumoto, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 133 days.

(21) Appl. No.: 15/030,413

(22) PCT Filed: Oct. 20, 2014

(86) PCT No.: PCT/JP2014/077842
§ 371 (c)(1),
(2) Date: Apr. 19, 2016

(87) PCT Pub. No.: WO2015/060253
PCT Pub. Date: Apr. 30, 2015

(65) Prior Publication Data
US 2016/0266368 A1 Sep. 15, 2016

(30) Foreign Application Priority Data
Oct. 22, 2013 (JP) .................................. 2013-219532

(51) Int. Cl.
*G02B 21/06* (2006.01)
*G02B 21/10* (2006.01)
(Continued)

(52) U.S. Cl.
CPC ......... *G02B 21/10* (2013.01); *G02B 21/0092* (2013.01); *G02B 21/33* (2013.01);
(Continued)

(58) Field of Classification Search
CPC .. G02B 21/00; G02B 21/0004; G02B 21/002; G02B 21/0032; G02B 21/0052;
(Continued)

(56) References Cited

U.S. PATENT DOCUMENTS

| 6,898,004 | B2 * | 5/2005 | Shimizu | ................. G02B 21/16 359/385 |
| 2010/0141750 | A1 * | 6/2010 | Osawa | ................... G02B 21/06 348/79 |

(Continued)

FOREIGN PATENT DOCUMENTS

| JP | 2000-081383 A | 3/2000 |
| JP | 2004-138735 A | 5/2004 |

(Continued)

OTHER PUBLICATIONS

R. Fiolka et al., "Structured illumination in total internal reflection fluorescence microscopy using a spatial light modulator", Optics Letters, USA, Optical Society of America, vol. 33, No. 14, 2008, p. 1629-1631.

(Continued)

*Primary Examiner* — Arnel C Lavarias
(74) *Attorney, Agent, or Firm* — Drinker Biddle & Reath LLP

(57) ABSTRACT

A total internal reflection light illumination apparatus includes a light source providing illumination light L1, a spatial light modulator inputting the illumination light L1 and converging and outputting the illumination light L1 by presenting a lens pattern, an objective lens illuminating an object substrate with illumination light L2 converged and output by the spatial light modulator, and a calculation unit providing, to the spatial light modulator, the lens pattern corresponding to at least one of a desired polarization state, desired penetration length, desired shape, and desired light intensity of the evanescent light L3. The lens pattern con- (Continued)

verges the illumination light L2 on a pupil plane of the objective lens.

16 Claims, 19 Drawing Sheets

(51) Int. Cl.
| | |
|---|---|
| *G02B 21/33* | (2006.01) |
| *G02B 21/00* | (2006.01) |
| *G02B 21/36* | (2006.01) |
| *G02B 27/56* | (2006.01) |
| *G02B 27/48* | (2006.01) |

(52) U.S. Cl.
CPC ........... *G02B 21/365* (2013.01); *G02B 27/48* (2013.01); *G02B 27/56* (2013.01); *G02B 21/06* (2013.01)

(58) Field of Classification Search
CPC .............. G02B 21/006; G02B 21/0068; G02B 21/0076; G02B 21/0092; G02B 21/06; G02B 21/08; G02B 21/082; G02B 21/084
USPC ....... 359/362, 363, 368, 369, 385, 386, 387, 359/388, 389, 390
See application file for complete search history.

(56) References Cited

U.S. PATENT DOCUMENTS

| | | | |
|---|---|---|---|
| 2011/0193269 A1* | 8/2011 | Ito ....................... | B23K 26/032 264/400 |
| 2014/0299742 A1* | 10/2014 | Fujii ..................... | G02B 21/14 250/201.3 |
| 2015/0323787 A1* | 11/2015 | Yuste ................. | G02B 27/0075 348/79 |
| 2016/0320600 A1* | 11/2016 | Dake ..................... | G02B 21/06 |
| 2016/0349496 A1* | 12/2016 | Watanabe ............ | G02B 21/365 |

FOREIGN PATENT DOCUMENTS

| | | |
|---|---|---|
| JP | 2004-309785 A | 11/2004 |
| JP | 2006-154290 A | 6/2006 |
| JP | 2006-275685 A | 10/2006 |
| JP | 2006-276377 A | 10/2006 |
| WO | WO 2013/130077 | 9/2013 |

OTHER PUBLICATIONS

International Preliminary Report on Patentability dated Apr. 26, 2016 for PCT/JP2014/077842.

* cited by examiner (a)

(b)

(a)

(b)

(a)                          (b)

(a)

(b)

(a)

(b)

(a)

(b)

(a)

(b)

(c)

(a)

(b)

(a)

(d)

(b)

(e)

(c)

(f)

TOTAL INTERNAL REFLECTION LIGHT ILLUMINATION DEVICE

TECHNICAL FIELD

The present invention relates to a total internal reflection light illumination apparatus.

BACKGROUND ART

Evanescent light that occurs upon total reflection of light is capable of selectively illuminating only the vicinity of a total reflection interface as well as drastically reducing background light from regions other than an illuminated region. Therefore, a total internal reflection light illumination apparatus using evanescent light is employed in a large number of microscopic observations of an extremely thin object such as cells (for example, refer to Patent Literature 1).

As a microscope employing a total internal reflection light illumination apparatus, a light illumination technique is disclosed where a diffraction diffusion plate is used and thereby evanescent light having all polarization directions in three dimensions is generated and thus a sample can be observed regardless of a direction of the sample (Patent Literature 2). Further, another light illumination technique is disclosed where a DMD (Digital Micromirror Device) or the like is used and thereby light of an annular shape is generated, allowing for effective use of evanescent light (Patent Literatures 3 and 4). Furthermore, still another light illumination technique is disclosed where a spatial light modulator and a lens are combined and two light condensing points are provided at arbitrary positions on an incident pupil plane, thereby a surface of a sample is illuminated in a stripe pattern (Non Patent Literature 1).

CITATION LIST

Patent Literature

Patent Literature 1: Japanese Patent Application Laid-Open Publication No. 2004-309785
Patent Literature 2: Japanese Patent Application Laid-Open Publication No. 2004-138735
Patent Literature 3: Japanese Patent Application Laid-Open Publication No. 2000-81383
Patent Literature 4: Japanese Patent Application Laid-Open Publication No. 2006-275685
Patent Literature 5: Japanese Patent Application Laid-Open Publication No. 2006-276377

Non Patent Literature

Non Patent Literature 1: R. Fiolka et al., "Structured illumination in total internal reflection fluorescence microscopy using a spatial light modulator", Optics Letters, USA, Optical Society of America, July 2008, Vol. 33, No. 14, pp. 1629-1631.

SUMMARY OF INVENTION

Technical Problem

In a total internal reflection light illumination apparatus for illuminating an object with light and thereby generating evanescent light, it is desirable that a polarization state, penetration length, shape, or light intensity of the evanescent light can be arbitrarily controlled. This is because arbitrarily controlling these enables implementation of various illumination modes. With the light illumination technique employed to conventional total internal reflection microscopes, however, for example, when a diffraction diffusion plate is used, a mechanical mechanism is required for the diffraction diffusion plate, thus resulting in a complicated configuration, and moreover, switching illumination conditions of the evanescent light is difficult.

The present invention has been made in view of the above problem, and an object thereof is to provide a total internal reflection light illumination apparatus capable of easily operating a polarization state, penetration length, shape, and light intensity of evanescent light with a simple configuration.

Solution to Problem

In order to solve the above-described problem, a total internal reflection light illumination apparatus according to the present invention generates evanescent light by illuminating an object with light, the total internal reflection light illumination apparatus includes a light source for providing illumination light; a spatial light modulator for inputting the illumination light, and converging and outputting the illumination light by presenting a lens pattern; an objective lens for illuminating the object with the light by illuminating an object surface with the illumination light converged and output by the spatial light modulator and thereby causing total reflection; and a calculation unit for providing, to the spatial light modulator, the lens pattern corresponding to at least one of a desired polarization state, desired penetration length, desired shape, and desired light intensity of the evanescent light, and the lens pattern is a pattern for converging the illumination light on a pupil plane of the objective lens.

The present inventors have found that, when the illumination light converges on the pupil plane of the objective lens in the total internal reflection light illumination apparatus, varying a converging shape or converging position of the light results in a significant change in the polarization state, penetration length, shape, or light intensity of the evanescent light. Moreover, in this total internal reflection light illumination apparatus, an electronic command from the calculation unit causes the lens pattern to be displayed on the spatial light modulator, and thus the converging shape or converging position on the pupil plane of the objective lens can be easily changed.

Therefore, for example, evanescent light having desired polarization from among P polarization and S polarization can be obtained according to polarization dependency of the object. Furthermore, evanescent light having a desired penetration length, shape, or light intensity can be obtained according to a state of the object in terms of thickness, concentration, or the like. In this manner, the total internal reflection light illumination apparatus described above allows for easy operation of a polarization state, penetration length, shape, and light intensity of the evanescent light with a simple configuration.

Advantageous Effects of Invention

According to a total internal reflection light illumination apparatus of the present invention, a total internal reflection light illumination apparatus capable of easily operating a polarization state, penetration length, shape, and light intensity of evanescent light can be provided with a simple configuration.

DESCRIPTION OF EMBODIMENTS

Embodiments of a total internal reflection light illumination apparatus of the present invention will be described below in detail with reference to accompanying drawings. In the description of the drawings, the same elements will be denoted by the same reference signs, without redundant description.

Figure 1:
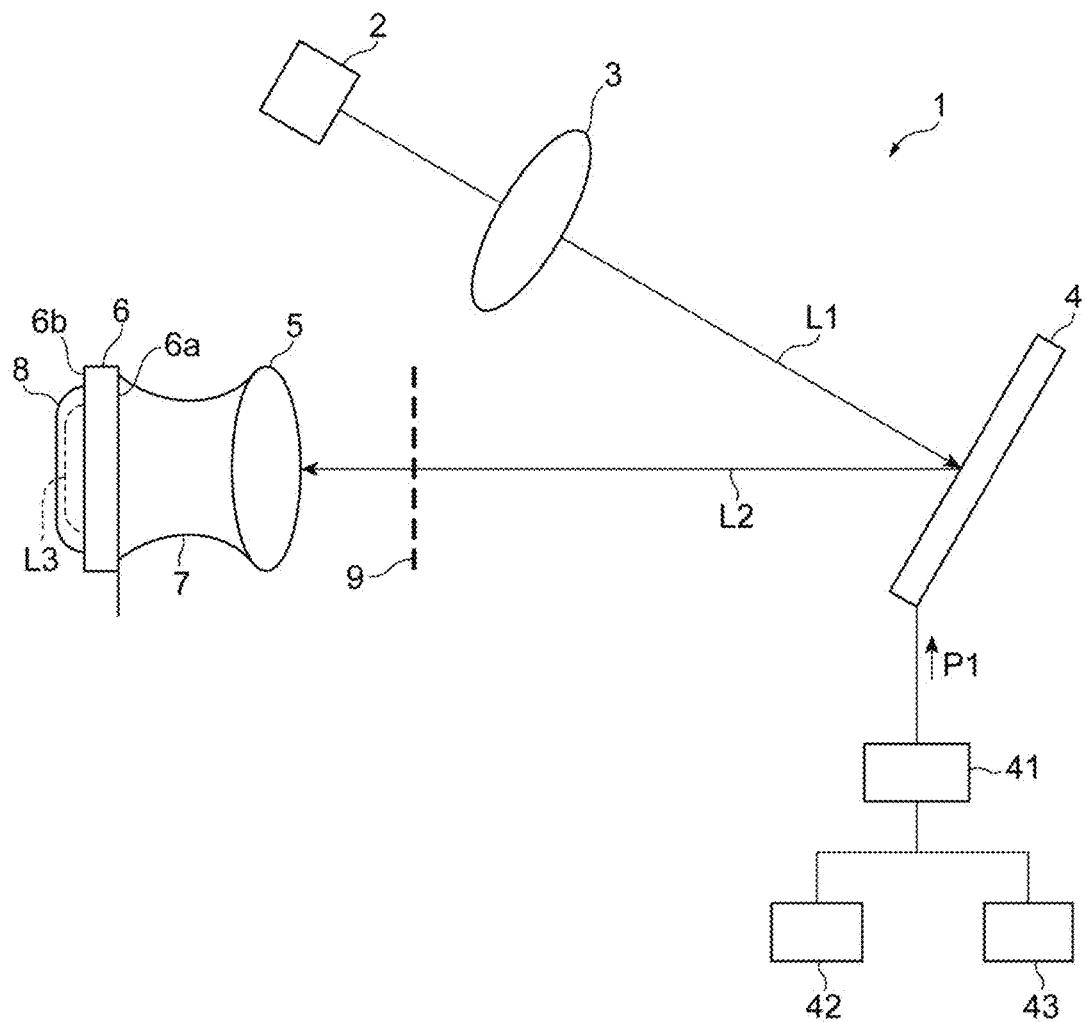
FIG. 1 is a diagram illustrating a configuration of a total internal reflection light illumination apparatus according to the present embodiment.

FIG. 1 is a diagram illustrating a configuration of a total internal reflection light illumination apparatus according to the present embodiment. A total internal reflection light illumination apparatus 1 includes a light source 2 for providing illumination light L1, a condensing lens 3, a spatial light modulator 4, an objective lens 5, an object substrate 6, and a calculation unit 41. The spatial light modulator 4 is optically coupled to the light source 2, while the condensing lens 3 is disposed on an optical axis between the light source 2 and the spatial light modulator 4. The object substrate 6 includes an illumination light receiving surface 6a and an object mounting surface 6b, and the illumination light receiving surface 6a faces the objective lens 5 while the object mounting surface 6b is positioned on the opposite side of the illumination light receiving surface 6a. The object substrate 6 is optically coupled to the spatial light modulator 4 while the objective lens 5 is disposed between the object substrate 6 and spatial light modulator 4.

The calculation unit 41 includes an input unit 42 and a display unit 43, and the input unit 42 and display unit 43 are electrically coupled to a main unit of the calculation unit 41. The calculation unit 41 is electrically coupled to the spatial light modulator 4. Immersion oil 7 having a refractive index equivalent to that of the object substrate 6 is provided between the objective lens 5 and the object substrate 6. An object 8 is placed on the object mounting surface 6b. A dashed line in the figure represents a pupil plane 9 of the objective lens 5.

The illumination light L1 is emitted from the light source 2, then passes through the condensing lens 3, and reaches the spatial light modulator 4. The illumination light L1 is modulated by the spatial light modulator 4, and illumination light L2 after modulation passes through the objective lens 5 and then enters the object substrate 6 with a predetermined angle. The illumination light L2 after modulation is subjected to total reflection by the object substrate 6, and evanescent light L3 penetrates from the object mounting surface 6b and illuminates the object 8. Since the object 8 is placed on the object mounting surface 6b, incidence of the illumination light L2 on the object substrate 6 has the same role as that of direct incidence of the illumination light L2 on an object surface of the object 8.

A lens pattern P1 is provided by the calculation unit 41 to the spatial light modulator 4. The lens pattern P1 is a pattern having a lens effect and may be, for example, a Fresnel lens pattern, toroidal lens pattern, or toroidal-Fresnel lens pattern. Further, the lens pattern may be a Fresnel lens pattern superimposed with a desired pattern. A case where the Fresnel lens pattern is used as the lens pattern P1 will be described below.

Where a phase value on a coordinate (x, y) is represented by $\phi(x, y)$, the Fresnel lens pattern P1 is as represented by formula (1).

[Formula 1]

$$\phi(x, y) = \frac{\pi((x - x_0)^2 + (y - y_0)^2)}{f\lambda} [\text{rad.}] \quad (1)$$

Here, the values $x_0$ and $y_0$ represent coordinates (hereinafter referred to as the center coordinates) corresponding to the center of the objective lens 5. Further, the values f and λ represent a focal length of the objective lens 5 and a wavelength of the illumination light L2, respectively. The Fresnel lens pattern P1 is generated from formula (1), the Fresnel lens pattern P1 is presented on the spatial light modulator 4, and thus the illumination light L1 is output while converging. In the present embodiment, the illumination light L2 converges on the pupil plane 9 in a convergence mode of, for example, point-shaped or annular-shaped.

Figure 2:
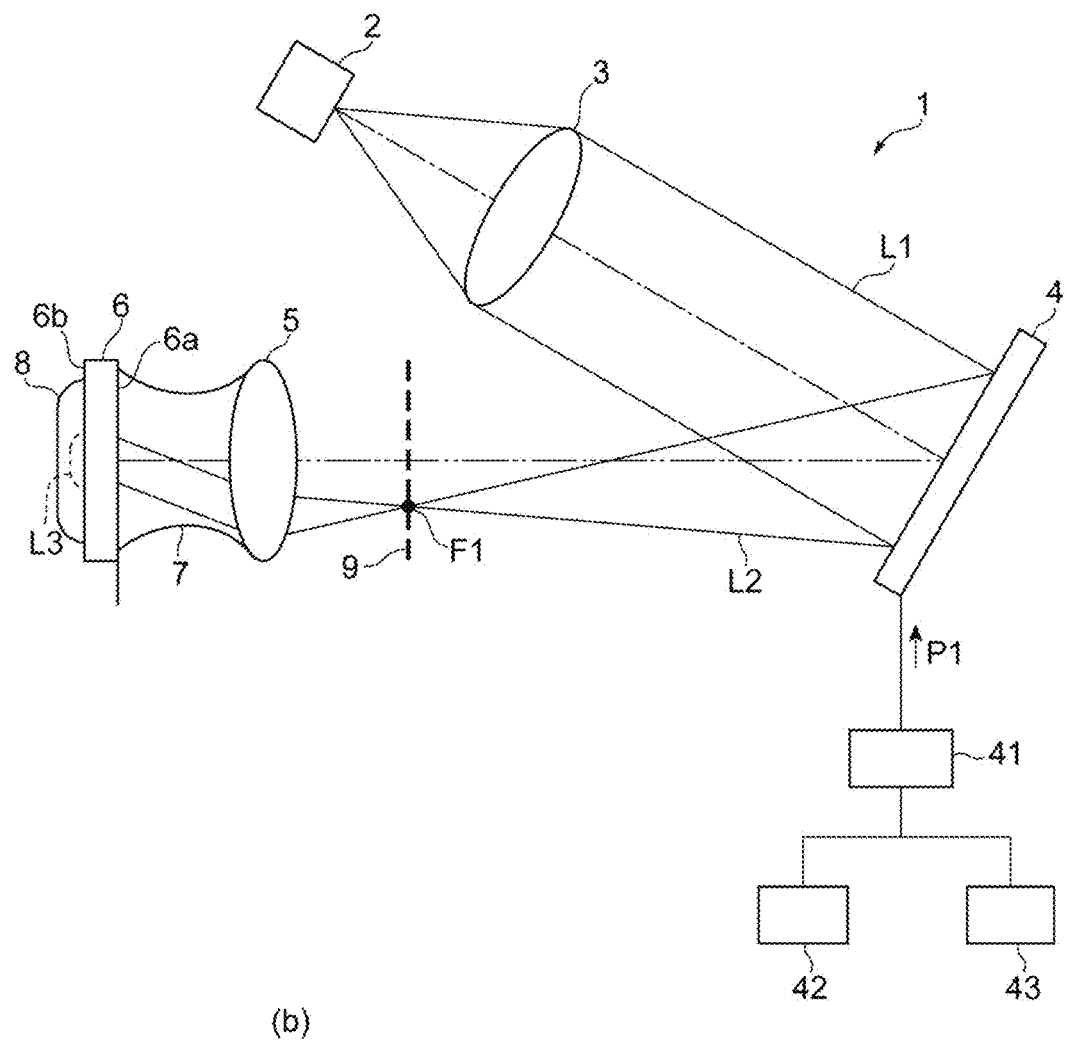
FIG. 2 includes (a), (b) diagrams illustrating illumination light L2 when illumination light converges into a point shape on a pupil plane.
Figure 2:
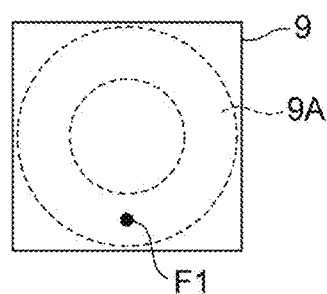

(a) and (b) in FIG. 2 are diagrams illustrating the illumination light L2 when the illumination light L2 converges into a point shape on the pupil plane 9. (a) in FIG. 2 illustrates a configuration of the total internal reflection light illumination apparatus 1 illustrated in FIG. 1, and (b) in FIG. 2 illustrates the pupil plane 9 seen from an optical axis direction of the illumination light L2 and a region 9A included in the pupil plane 9. The region 9A represents an area where the illumination light L2 passes through for generating total reflection. In the point-shaped convergence mode, the illumination light L2 converges into a point shape at a position on the pupil plane 9 illustrated in (b) in FIG. 2. A point where an optical path of the illumination light L2 and the pupil plane 9 intersect is hereinafter referred to as a converging point F1. After convergence on the pupil plane 9, the illumination light L2 is caused to be parallel light by the objective lens 5 and illuminates the object substrate 6. The evanescent light L3 penetrating from the object substrate 6 illuminates a wider area of the object 8 as compared to the annular-shaped convergence mode, which will be described later. Illumination with the evanescent light L3 in the point-shaped convergence mode is hereinafter referred to as plane illumination.

Figure 3:
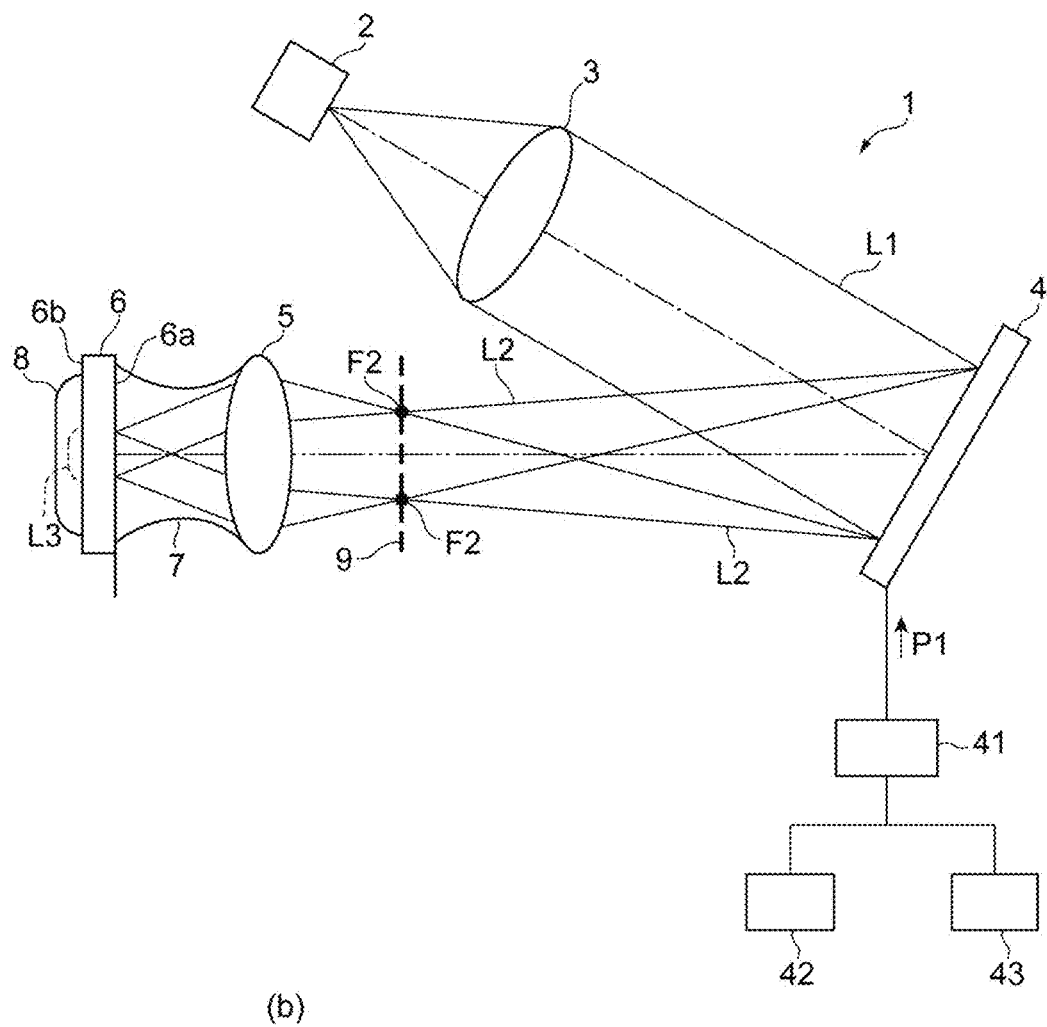
FIG. 3 includes (a), (b) diagrams illustrating the illumination light L2 when illumination light converges into an annular shape on the pupil plane.
Figure 3:
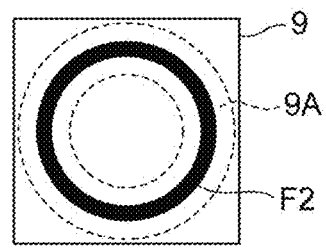

(a) and (b) in FIG. 3 are diagrams illustrating the illumination light L2 when the illumination light L2 converges into an annular shape on the pupil plane 9. (a) in FIG. 3 illustrates a configuration of the total internal reflection light illumination apparatus 1 illustrated in FIG. 1, and (b) in FIG. 3 illustrates the pupil plane 9 seen from the optical axis direction of the illumination light L2 and the region 9A included in the pupil plane 9. In the annular-shaped convergence mode, the illumination light L2 converges into an annular shape at a position on the pupil plane 9 illustrated in (b) in FIG. 3. A ring where an optical path of the illumination light L2 and the pupil plane 9 intersect is hereinafter referred to as a converging ring F2. After convergence on the pupil plane 9, the illumination light L2 is caused to be annular-shaped parallel light by the objective lens 5 and illuminates the object substrate 6. Here, as the annular-shaped parallel light approaches the object substrate 6 an outer diameter thereof becomes smaller and respective circumferential parts are superimposed with each other on the object substrate 6. This results in cancelling out due to interference and thus an illumination area becomes smaller as compared to the point-shaped convergence mode. Illumination with the evanescent light L3 in the annular-shaped convergence mode is hereinafter referred to as point illumination.

Figure 4:
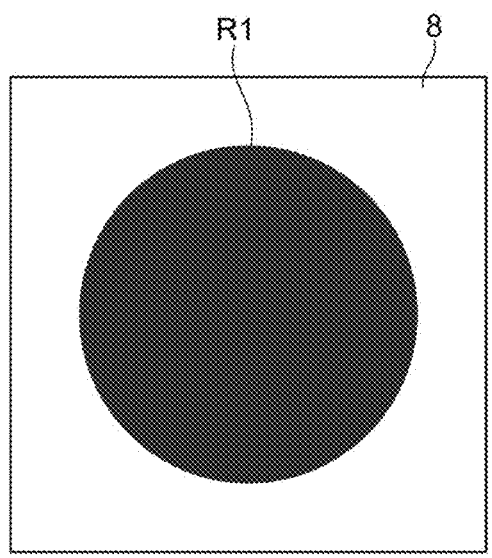
FIG. 4 includes (a), (b) diagrams comparing illumination areas in plane illumination and point illumination.
Figure 4:
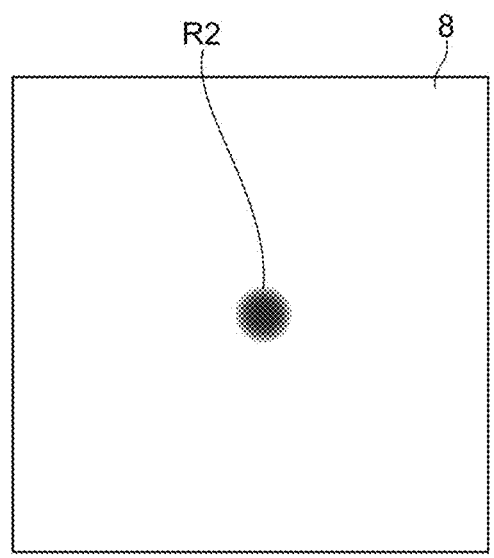

(a) and (b) in FIG. 4 are diagrams comparing illumination areas in plane illumination and point illumination, (a) in FIG. 4 illustrates an illumination region R1 by plane illumination, and (b) in FIG. 4 illustrates an illumination region R2 by point illumination. With plane illumination in (a) in FIG. 4, a wide region of the object 8 is illuminated with the evanescent light L3 at one time. A spatial resolution is about several microns. On the other hand, with point illumination in (b) FIG. 4, although a region illuminated with the evanescent light L3 at one time is narrower as compared to that of plane illumination, influence of speckle noise is reduced and a spatial resolution is up to about several hundreds nano. According to a state of the object 8, any one of plane illumination (that is, the point-shaped convergence mode) and point illumination (that is, the annular-shaped convergence mode) is selected based on, for example, input from the input unit 42.

Figure 5:
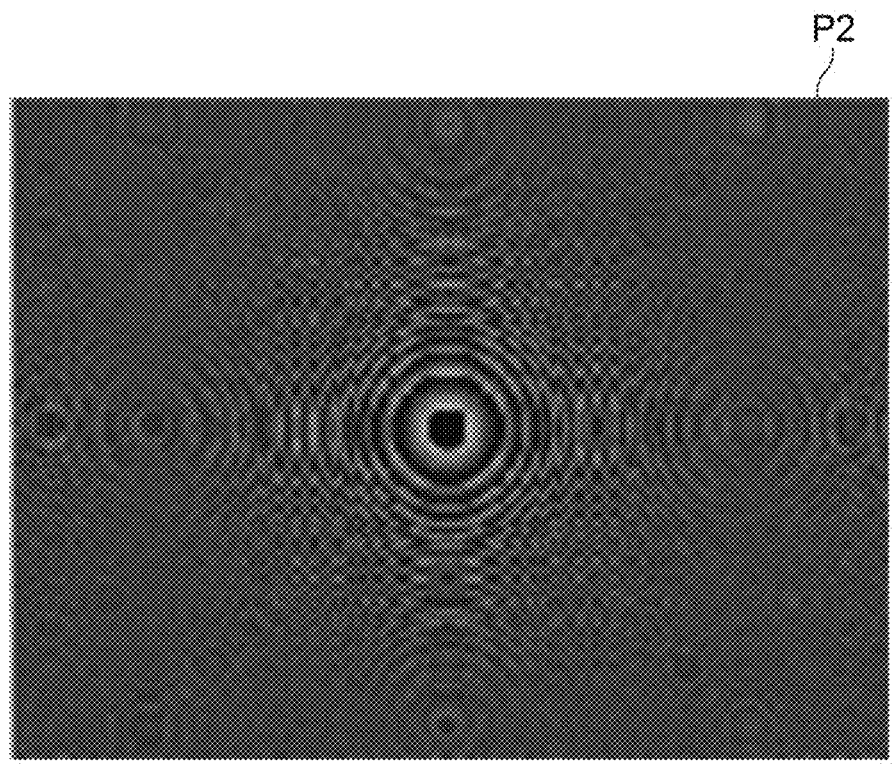
FIG. 5 is a diagram illustrating a Fresnel lens pattern for plane illumination as an example of the Fresnel lens pattern.

FIG. 5 is a diagram illustrating a Fresnel lens pattern P2 for plane illumination as an example of the Fresnel lens pattern P1. In FIG. 5, phase values are illustrated by shading of color. With the Fresnel lens pattern P2 illustrated in FIG. 5, the illumination light L2 has the converging point F1, for example, at the position on the pupil plane 9 illustrated in (b) in FIG. 2.

Figure 6:
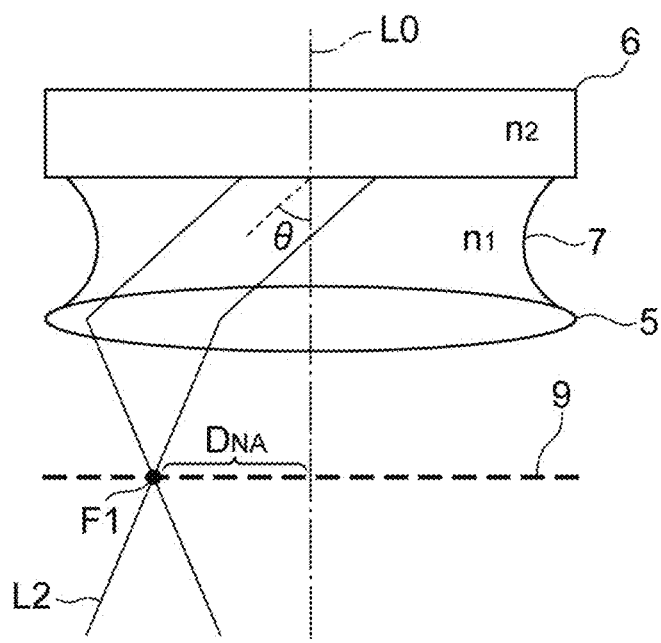
FIG. 6 includes (a), (b) diagrams illustrating a total reflection mode of illumination light in plane illumination.
Figure 6:
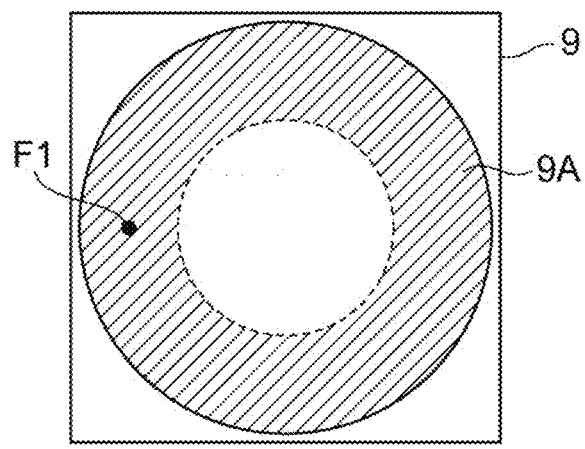

(a) and (b) in FIG. 6 are diagrams illustrating a total reflection mode of the illumination light L2 in plane illumination. (a) in FIG. 6 is a diagram illustrating the illumination light L2 caused to be parallel light by the objective lens 5 after convergence on the pupil plane 9 and then entering the object substrate 6. (b) in FIG. 6 illustrates the pupil plane 9 seen from the optical axis direction of the illumination light L2 and the region 9A included in the pupil plane 9.

An incident angle θ of the illumination light L2 is expressed by formula (2) using a distance $D_{NA}$ on the pupil plane 9 from an optical axis L0 of the objective lens 5 to an optical path of the illumination light L2.

[Formula 2]

$$\theta = \sin^{-1}(D_{NA}/n_1) \qquad (2)$$

Here, $n_1$ represents a refractive index of glass forming the object substrate 6 and the immersion oil 7. From formula (2), it is derived that the illumination light L2 is subjected to total reflection by the object substrate 6 when the illumination light L2 converges into a point shape on the pupil plane 9 within a range of the value $D_{NA}$ where the incident angle θ and a critical angle $\theta_c$ satisfy a relational expression $\theta > \theta_c$. From formula (2), it is also derived that, when a position of the converging point F1 changes, the incident angle θ also changes accordingly. As described above, the illumination light L2 is subjected to total reflection when the converging point F1 is in the region 9A indicated by hatched lines in the pupil plane 9 in (b) in FIG. 6.

The critical angle $\theta_c$ is as expressed by formula (3).
[Formula 3]

$$\theta_c = \sin^{-1}(n_2/n_1) \qquad (3)$$

Here, $n_2$ represents a refractive index of a region in contact with the object mounting surface 6b and external to the object substrate 6.

Figure 7:
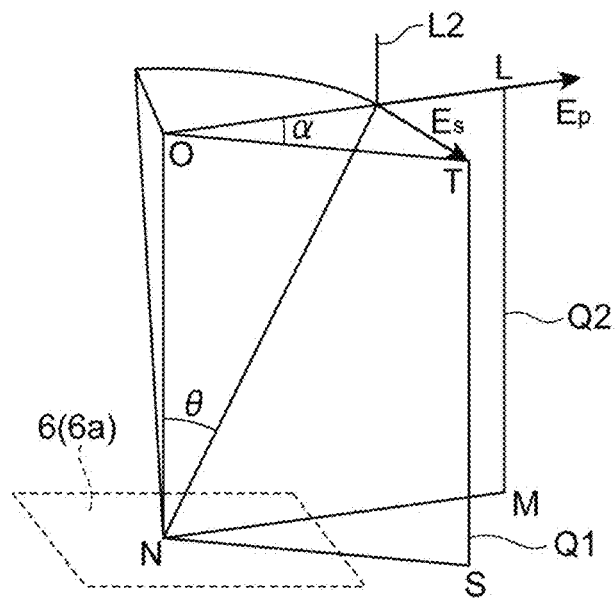
FIG. 7 includes (a), (b) diagrams illustrating the principle of polarization operation of illumination light.
Figure 7:
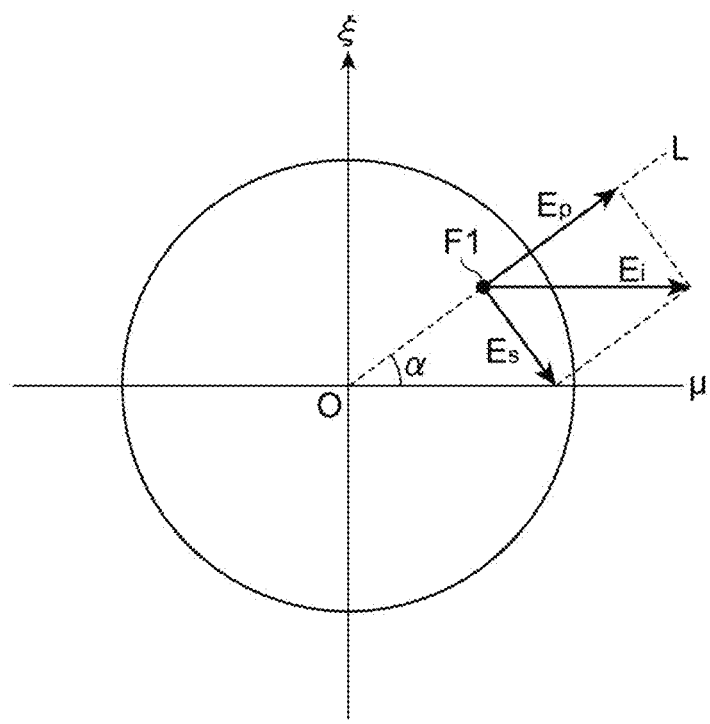

With plane illumination, when a position of the converging point F1 changes, not only the incident angle θ of the illumination light L2 on the object substrate 6 but also a polarization state of the illumination light L2 upon entering the object substrate 6 change. (a) and (b) in FIG. 7 are diagrams illustrating the principle of polarization operation of the illumination light L2, (a) in FIG. 7 illustrates an incidence plane of the illumination light L2 on the object substrate 6. In (a) in FIG. 7, a plane OTSN is a reference plane Q1 perpendicular to the pupil plane 9, and a plane OWN is an incidence plane Q2 of the illumination light L2. The reference plane Q1 and the incidence plane Q2 form an angle α. The illumination light L2 passes within the incidence plane Q2 and enters the object substrate 6 with the incident angle θ. (b) in FIG. 7 is a graph for describing a polarization state of the illumination light L2 and illustrates a frequency space of the pupil plane 9 having μ-ξ axes. The reference plane Q1 includes the μ axis and is perpendicular to a μ-ξ plane. Here, it is assumed that the converging point F1 is on a line of a line segment OL as illustrated in (b) in FIG. 7.

When the illumination light L2 is, for example, linearly polarized in the μ axis direction with an amplitude $E_i$, a polarization state of the illumination light L2 upon entering the object substrate 6 is expressed by formulas (4) to (6).

[Formula 4]
$$E_p = E_i \cos \alpha \quad (4)$$

[Formula 5]
$$E_s = E_i \sin \alpha \quad (5)$$

[Formula 6]
$$\alpha = \tan^{-1}\left(\frac{\xi}{\mu}\right) \quad (6)$$

Here, values Ep and Es represent amplitudes of a P-polarized component and an S-polarized component, respectively, of the illumination light L2. From formulas (4) to (6), it is shown that the values Ep and Es are uniquely determined in relation to the angle α, and that when an angular position of the converging point F1 on the pupil plane 9 changes, polarization state of the illumination light L2 also changes. That is, polarization state of the illumination light L2 that gives the evanescent light L3 suitable for a state of the object 8 can be obtained by operation of a position of the converging point F1 on the pupil plane 9.

Figure 8:
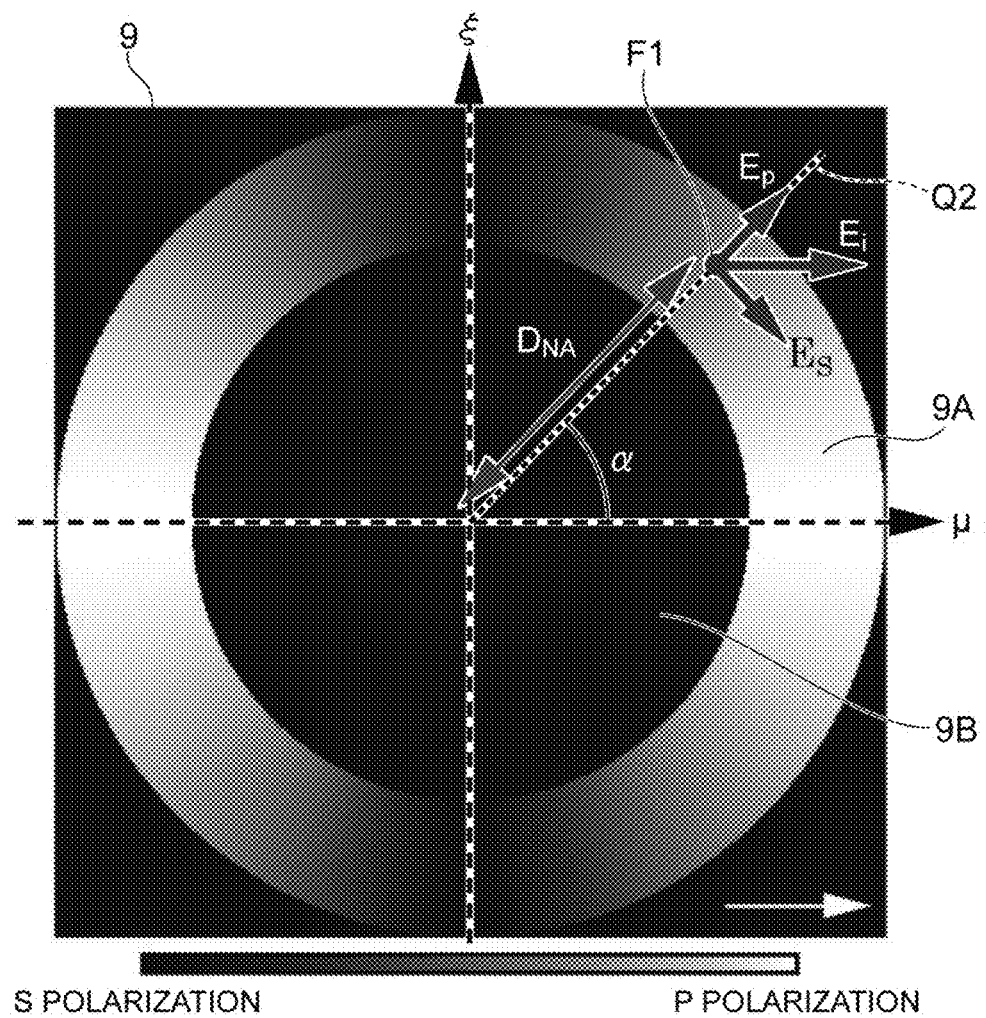
FIG. 8 is a diagram visually illustrating a relationship between an angle on the pupil plane and a polarization plane of the illumination light.

FIG. 8 is a diagram visually illustrating a relationship between the angle α on the pupil plane 9 and a polarization plane of the illumination light L2. In FIG. 8, a ratio of P polarization and S polarization of the illumination light L2 is represented by shading of color in the region 9A on the pupil plane 9. A region 9B in black inside the region. 9A represents a region where the illumination light L2 is not subjected to total reflection and is transmitted. In FIG. 8, as the shade becomes lighter in the region 9A, a ratio of the P-polarized component increases while a ratio of the S-polarized component decreases. On the other hand, as the shade becomes darker in the region 9A, a ratio of the P-polarized component decreases while a ratio of the S-polarized component increases.

Referring to FIG. 8, it is clear that, when the converging point F1 is on the μ axis, the illumination light L2 has P polarization only, and when the converging point F1 is on the ξ axis, the illumination light L2 has S polarization only. It is also clear that, when the converging point F1 is at a position other than on the μ or ξ axes, the illumination light L2 includes both of P polarization and S polarization.

Operation of a position of the converging point F1 on the pupil plane 9 is performed in a preferable manner by generation of the Fresnel lens pattern P1, which, causes the illumination light L1 to converge into a point shape at the position, in the spatial light modulator 4 by an electronic command from the calculation wilt 41. Alternatively, it is preferable that a plurality of Fresnel lens patterns P1 corresponding to a plurality of polarization states are prepared in advance, and a pattern that generates a desired polarization state is selected from among the Fresnel lens patterns P1 having been prepared in advance. The selected pattern is then displayed on the spatial light modulator 4 by the electronic command from the calculation unit 41.

A light intensity (electric field intensity) of the evanescent light L3 formed on the object mounting surface 6b of the object substrate 6 varies depending on the incident angle θ and polarization state. A light intensity It(0) of the evanescent light L3 on the object mounting surface 6b of the object substrate 6 is the sum of a light intensity $I_p(0)$ of the P-polarized component and a light intensity $I_s(0)$ of the S-polarized component as expressed by formula (7).

[Formula 7]
$$It(0) = I_p(0) + I_s(0) \quad (7)$$

Here, the light intensity $I_p(0)$ of the P-polarized component and light intensity $I_s(0)$ of the S-polarized component of the evanescent light L3 in formula (7) can be expressed by formulas (8) and (9).

[Formula 8]
$$I_p(0) = I_{px} + I_{pz} \quad (8)$$

[Formula 9]
$$I_s(0) = I_{py} \quad (9)$$

Note that light intensities $I_{px}$, $I_{py}$, and $I_{pz}$ the evanescent light L3 are obtained from the following formulas (10) to (12).

[Formula 10]
$$I_{ps} = |E_p|^2 \left\{ \frac{4 \cos^2 \theta (\sin^2 \theta - n^2)}{n^4 \cos^2 \theta + \sin^2 \theta - n^2} \right\} \quad (10)$$

[Formula 11]
$$I_{ps} = |E_p|^2 \left\{ \frac{4 \cos^2 \theta \sin^2 \theta}{n^4 \cos^2 \theta + \sin^2 \theta - n^2} \right\} \quad (11)$$

[Formula 12]
$$I_{py} = |E_s|^2 \left( \frac{4 \cos^2 \theta}{1 - n^2} \right) \quad (12)$$

Here, θ represents the incident angle of the illumination light L2 on the object substrate 6, and n represents a refractive index ratio of $n_1$ and $n_2$ as expressed by formula (13).

[Formula 13]
$$n = \frac{n_2}{n_1} \quad (13)$$

The light intensity of the evanescent light L3 can be expressed by a function It(z) of a distance z from the object mounting surface 6b of the object substrate 6, and therefore, the penetration length d of the evanescent light L3 can be calculated from the function It(z) of the distance z. The light intensity It(z) of the evanescent light L3 is as expressed by formula (14).

[Formula 14]
$$I(z) = I(0) e^{-k/d} \quad (14)$$

Here, the value It(0) represents the light intensity of the evanescent light L3 on the object mounting surface 6b of the object substrate 6. The penetration length d of the evanescent light L3 is obtained from formula (15).

[Formula 15]
$$d = \frac{\lambda_0}{4\pi} (n_1^2 \sin^2 \theta - n_2^2)^{-1/2} \quad (15)$$

Figure 9:
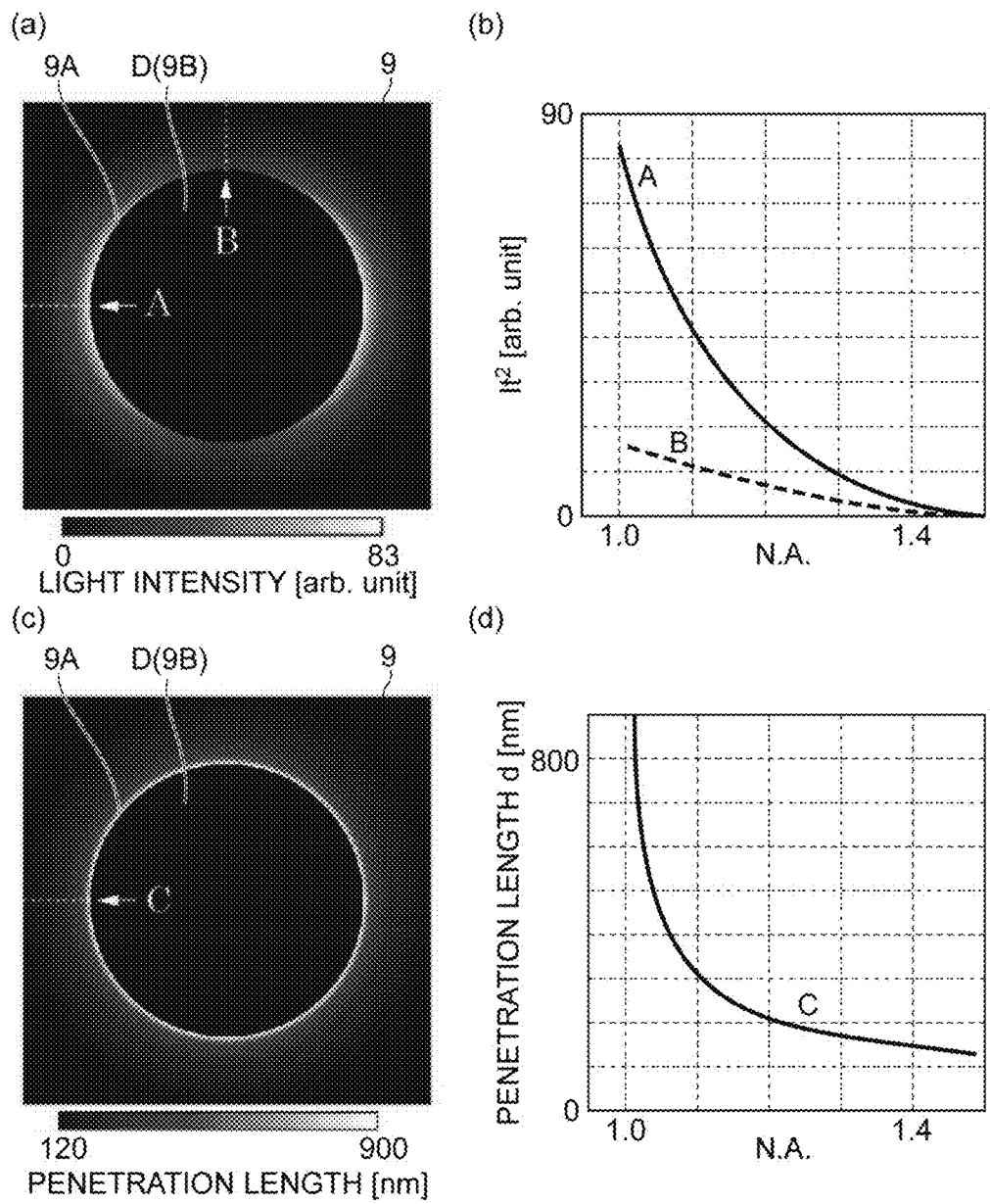
FIG. 9 includes (a)-(d) diagrams illustrating a relationship between a light intensity and penetration length of evanescent light and a position of a converging point on the pupil plane.

(a) to (d) in FIG. 9 are diagrams illustrating a relationship between the light intensity It and penetration length d of the evanescent light L3 and a position of the converging point F1 on the pupil plane 9. Note that a relationship expressed by formula (16) is assumed for calculation of the light intensity It of the evanescent light L3.
[Formula 16]

$$|E_p|^2+|E_S|^2=1 \quad (16)$$

The light intensity It of the evanescent light L3 is calculated as a square value of the intensity as expressed by formula (17). In formula (17), the value It(z) is represented by It.
[Formula 17]

$$It^2=(I_{px}+I_{py}+I_{pz})^2 \quad (17)$$

(a) in FIG. 9 is a calculation result of a relationship between a position of the converging point F1 on the pupil plane 9 and a square value $It^2$ of light intensity on the object mounting surface 6b. In the figure, a circular region D in black in the center corresponds to the region 9B of the pupil plane 9 where the illumination light L2 is not subjected to total reflection and is transmitted. Positions on the pupil plane 9 corresponding to dashed lines A and B represent polarization states of P polarization only and S polarization only, respectively. The state of P polarization only (dashed line A) is represented brighter than that of S polarization only (dashed line 13), showing that the square value $It^2$ of light intensity is large.

(b) in FIG. 9 is a calculation result of numerical aperture (N.A.) value dependency of the square value $It^2$ of light intensity, in (b) in FIG. 9, the magnitude of the square value $It^2$ of light intensity on the vertical axis is normalized and is represented in an arbitrary unit. Further, in (b) in FIG. 9, a distance between the center of the pupil, plane 9 and the converging point F1 is represented by the N.A. value. In the figure, when the incident angle θ is equal to the critical angle $θ_c$, the N.A. value is 1.0, and when the incident angle θ exceeds the critical angle $θ_c$, the N.A. value exceeds 1.0. Both of the light intensity It of the dashed line A and the light intensity it of the dashed line 13 have a similar tendency, and when the N.A. value is larger; namely, when the incident angle θ is larger as compared to the critical angle $θ_c$ the square value $It^2$ of light intensity monotonically decreases. Inversely, it is shown that, when the incident angle θ is closer to the critical angle $θ_c$, the light intensity It on the object mounting surface 6b increases. In addition, correspondingly to (a) in FIG. 9, the square value $It^2$ of light intensity for the dashed line A is larger as compared to that for the dashed line B.

Note that, depending on a state of the object 8, it may be preferable that the light intensity It is not the maximum value, and in this case, changing the N.A. value to a preferable value results in the desired light intensity It. Changing the N.A. value is performed by changing a distance between a position of the converging point F1 on the pupil plane 9 and a center position of the pupil plane.

(c) in FIG. 9 is a calculation result of a relationship between a position of the converging point F1 on the pupil plane 9 and the penetration length d of the evanescent light L3. In the figure, the penetration length d is defined as a length where a light intensity of the evanescent light L3 is equal to $It^2$ multiplied by $e^{-2}$, $It^2$ being the square value of light intensity on the object mounting surface 6b. In this figure, the penetration length d of P polarization is calculated as a length where a light intensity of the P polarization is equal to $It^2$ multiplied by $e^{-2}$, and the penetration length d of S polarization is also calculated as a length where a light intensity of the S polarization is equal to $It^2$ multiplied by $e^{-2}$. Therefore, a difference in polarization states of P polarization and S polarization does not result in a difference in shade in the region 9A. Both of P polarization and S polarization are brightly represented in an uniform manner near the outer side of the region 9B.

(d) in FIG. 9 is a calculation result of N.A. value dependency of the penetration length d. Also in (d) in FIG. 9, the penetration length d is represented as a length where the light intensity of the evanescent light L3 is equal to It multiplied by $e^{-2}$, $It^2$ being the square value of the light intensity on the object mounting surface 6b, (d) in FIG. 9 is a calculation result for a dashed line C on the pupil plane 9 with a unit of nm for the penetration length d. Similarly to the case of the light intensity It in (b) in FIG. 9, when the N.A. value is larger, namely, when the incident angle θ is larger as compared to the critical angle $θ_c$, the penetration length d monotonically decreases. Inversely, it is shown that, when the incident angle θ is closer to the critical angle $θ_c$, the penetration length d increases.

Note that, similarly to the case of the light intensity It in (b) in FIG. 9, depending on a state of the object 8, it may be preferable that the penetration length d is not the maximum value, and in this case, changing the N.A. value to a preferable value results in the desired penetration length d. Similarly to the case of changing the light intensity It, changing the N.A. value is performed by changing the distance between a position of the converging point F1 on the pupil plane 9 and the center position of the pupil plane 9.

Figure 10:
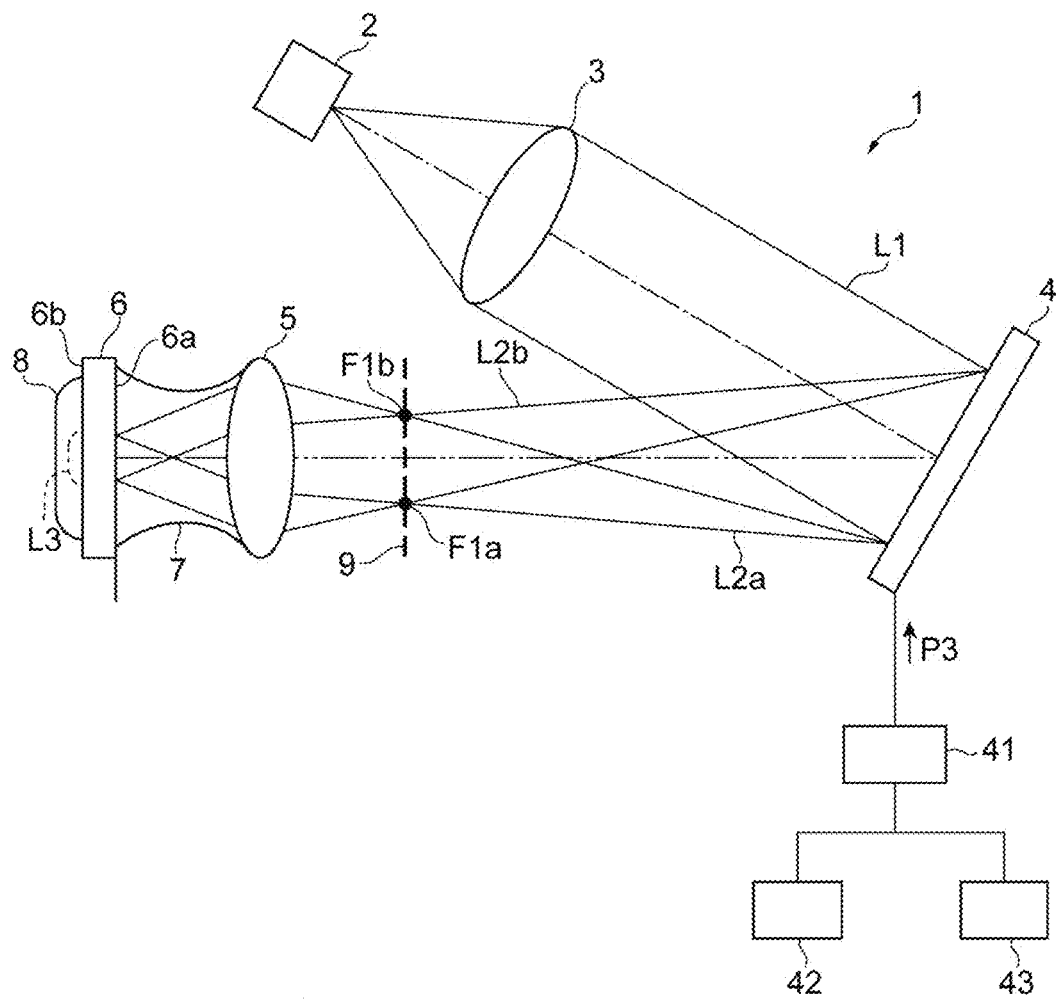
FIG. 10 includes (a), (b) diagrams illustrating a configuration with two converging points on the pupil plane.
Figure 10:
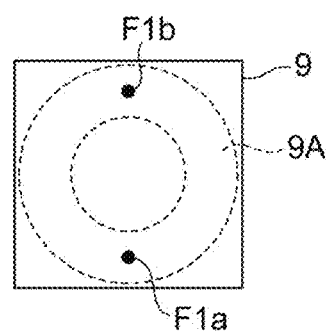

When the illumination light L2 forms the converging point F1 of a point shape on the pupil plane 9, plane illumination is performed, and further, when there are a plurality of converging points F1 on the pupil plane 9, plane illumination of a mode different from the above-described plane illumination is performed. FIG. 10 includes diagrams illustrating a configuration with two converging points F1a and F1b on the pupil plane 9. (a) in FIG. 10 illustrates a configuration of the total internal reflection light illumination apparatus 1 illustrated in FIG. 1, and (b) in FIG. 10 illustrates the pupil plane 9 seen from an optical axis direction of the illumination light L2 and a region 9A included in the pupil plane 9.

Figure 11:
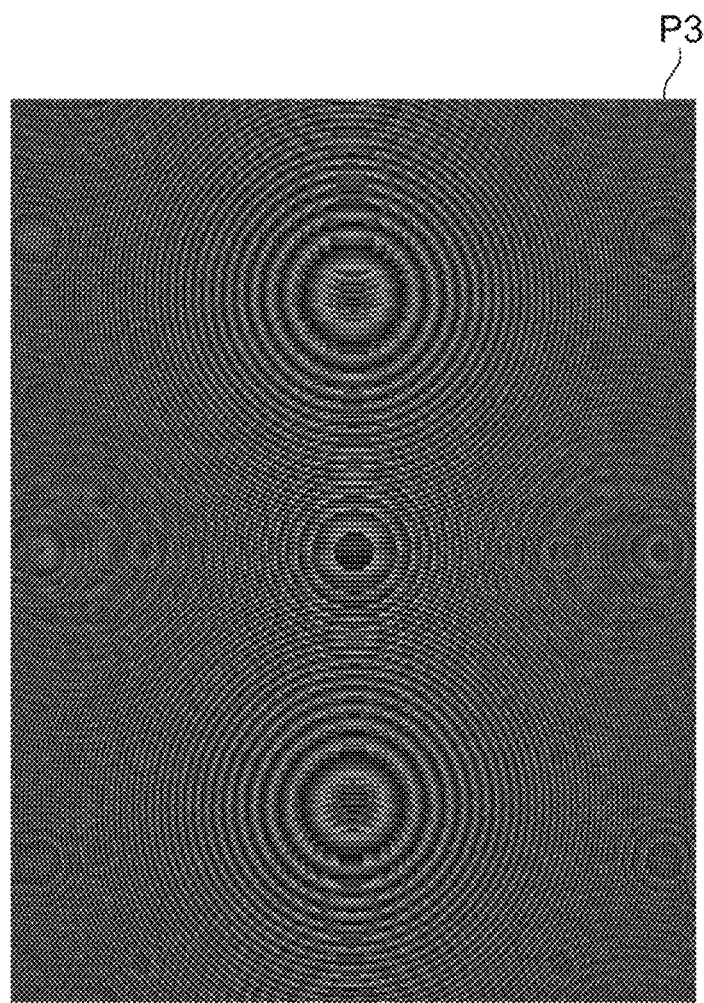
FIG. 11 is a diagram illustrating a Fresnel lens pattern for providing two converging points on a pupil plane 9.

FIG. 11 is a diagram illustrating a Fresnel lens pattern P3 providing two converging points F1a and F1b on the pupil plane 9. For example, in the configuration of the total internal reflection light illumination apparatus 1 illustrated in (a) in FIG. 10, presentation of the Fresnel lens pattern P3 in FIG. 11 results in two converging points F1a and F1b in the region 9A of the pupil plane 9. When this Fresnel lens pattern P3 is presented, illumination light components L2a and L2b passing through the converging points F1a and F1b, respectively, generate propagation light components propagating in opposite directions to each other on the object substrate 6. Therefore, the two propagation light components interfere with each other and thereby generate interference fringes, and the interference fringes are also generated in the evanescent light L3 illuminating the object 8.

Figure 12:
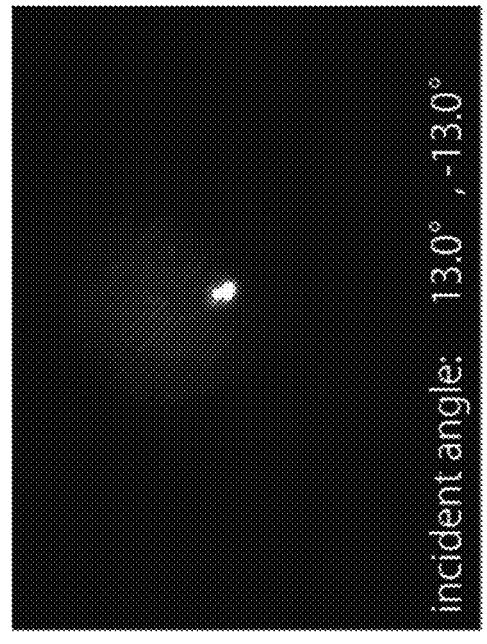
FIG. 12 includes (a), (b) diagrams illustrating observation results of interference fringes when there are two converging points on the pupil plane 9.
Figure 12:
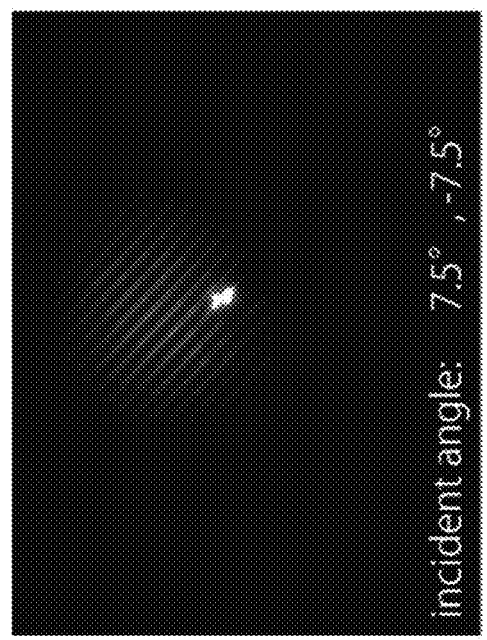
Figure 12:
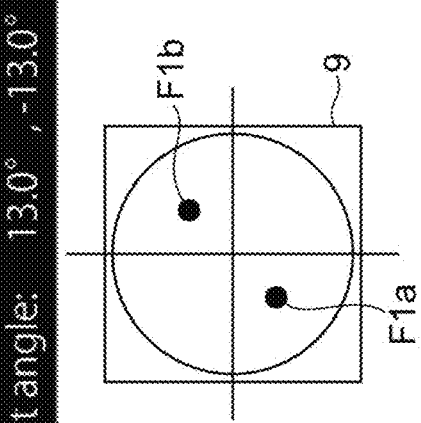
Figure 12:
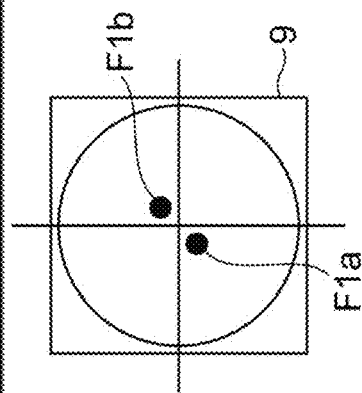

(a) and (b) in FIG. 12 are diagrams illustrating observation results of the interference fringes when there are two converging points F1a and F1b on the pupil plane 9. (a) in FIG. 12 illustrates an observation result when the incident angle θ of the illumination light L2 on the object substrate 6 is 7.5°, and (b) in FIG. 12 illustrates an observation result when the incident angle θ is 13.0°. Comparison between (a) in FIG. 12 and (b) in FIG. 12 shows that a shorter interval between the two converging points F1a and F1b results in a wider interval of the interference fringes. (a) and (b) in FIG. 12 illustrate that changing the incident angle θ of the illumination light L2, namely, changing the interval between the two converging points F1, allows for arbitrary operation of an interval among the interference fringes.

Figure 13:
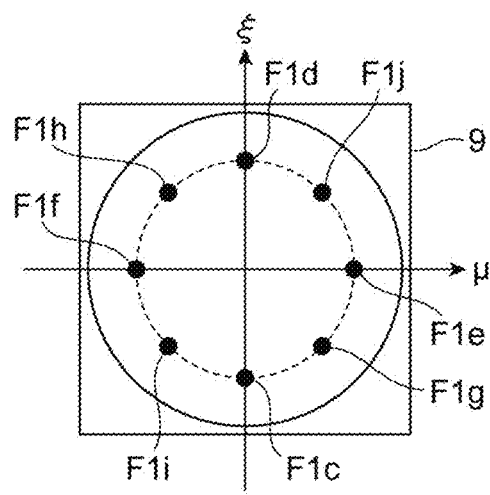
FIG. 13 includes (a)-(c) diagrams illustrating observation results of interference fringes of evanescent light when there are eight converging points on the pupil plane.
Figure 13:
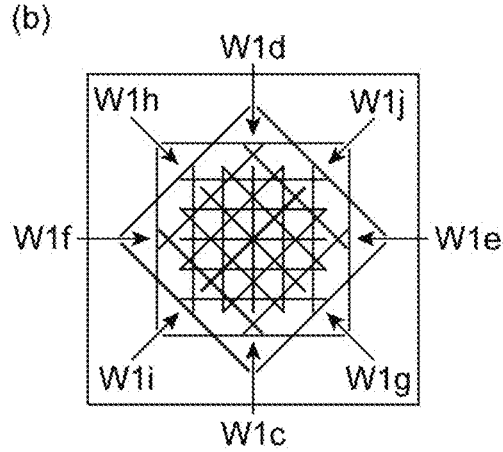
Figure 13:
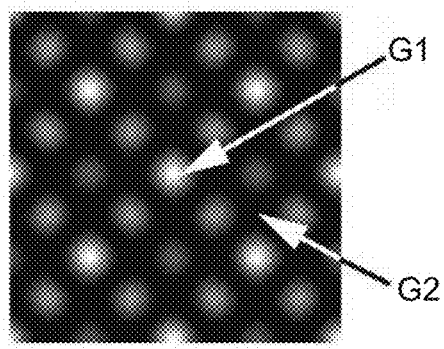

(a) to (c) in FIG. 13 are diagrams illustrating observation results of the interference fringes of evanescent light L3 when there are eight converging points on the pupil plane 9. With plane illumination, eight converging points F1c to F1j may be formed on an μ-ξ plane of the pupil plane 9. (a) in FIG. 13 illustrates the eight converging points F1c to F1j on the pupil plane 9. (b) in FIG. 13 conceptually illustrates propagation light components W1c to W1j from illumination light components passing through the converging points F1c to F1j, respectively, interfere with one another and thereby generate interference fringes. (c) in FIG. 13 illustrates the interference fringes of the evanescent light generated by interference of the propagation light components W1c to W1j. In (c) in FIG. 13, a part G1 represented brightly in white is a region of constructive interference while a part G2 represented darkly in black is a region of destructive interference. Also when there are eight converging points, changing the incident angle θ of the illumination light L2 allows for arbitrary operation of the interval among the interference fringes.

Figure 14:
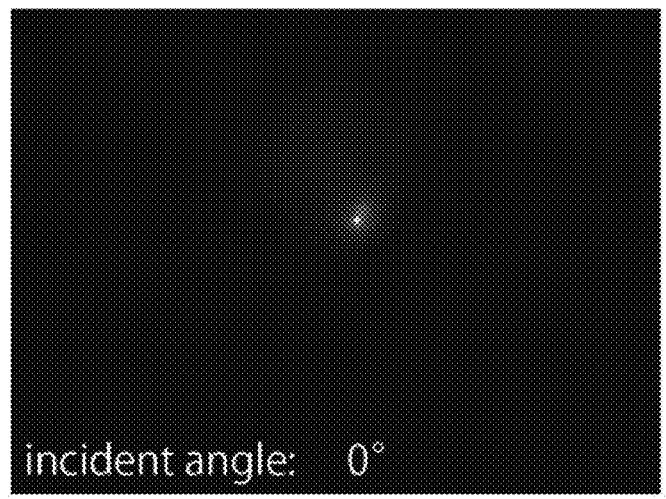
FIG. 14 is a diagram illustrating an observation result of illumination light passing through an object substrate when an incident angle θ of the illumination light is equal to zero degree.
Figure 14:
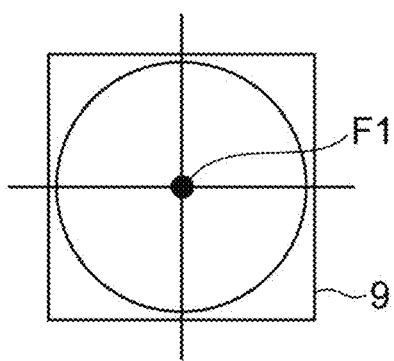

FIG. 14 is a diagram illustrating an observation result of illumination light L2 passing through the object substrate 6 when the incident angle θ of the illumination light L2 is equal to zero degree. When the incident angle θ of the illumination light L2 is zero degree, the illumination light L2 is not subjected to total reflection but passes through the object substrate 6 as it is. Therefore, light illumination on the object 8 with the evanescent light L3 does not occur. Since the number of the converging point F1 is one, no interference fringe is observed.

Figure 15:
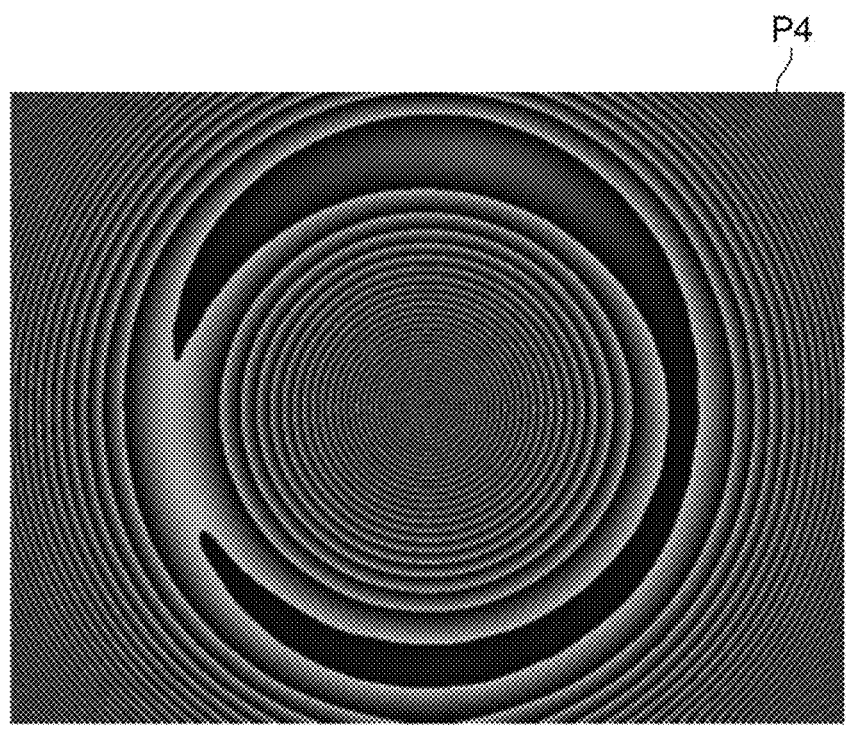
FIG. 15 is a diagram illustrating a toroidal-Fresnel lens pattern as an example of the Fresnel lens pattern for point illumination in an annular-shaped convergence mode.

FIG. 15 is a diagram illustrating, as an example of the lens pattern P1 for point illumination in an annular-shaped convergence mode, a lens pattern P4 where a toroidal-Fresnel lens pattern is superimposed with a pattern for correcting distortion by an optical system. With the toroidal-Fresnel lens pattern P4, for example in the configuration of the total internal reflection light illumination apparatus 1 illustrated in (a) in FIG. 3 described above, the illumination light L2 converges into an annular shape on the pupil plane 9 as illustrated in (b) in FIG. 3 and forms the converging ring F2. Also with point illumination where the convergence mode is annular-shaped, when the incident angle θ of the illumination light L2 on the object substrate 6 satisfies a relationship of θ>θ$_c$ in relation to the critical angle θ$_c$, the illumination light L2 is subjected to total reflection on the object substrate 6. An illumination mode of the evanescent light L3 for the object 8 is point-shaped with a small illumination area as described above.

Figure 16:
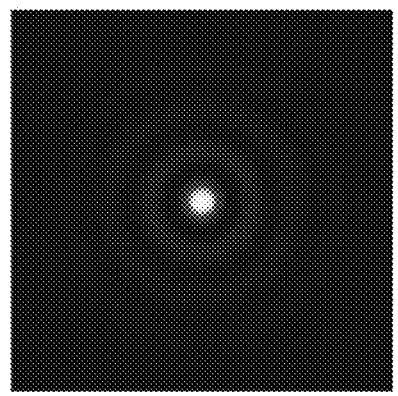
FIG. 16 shows (a), (b) observation results of point illumination in the annular-shaped convergence mode.
Figure 16:
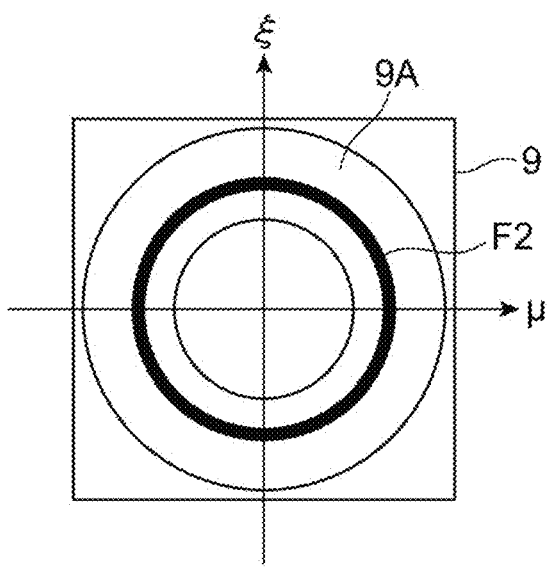

(a) and (b) in NG. 16 illustrate observation results of point illumination in the annular-shaped convergence mode, (a) in FIG. 16 illustrates an observation result of the evanescent light L3, and (b) in FIG. 16 illustrates the converging ring F2 on the pupil plane 9. On the pupil plane 9, the converging ring F2 is formed in the region 9A where the incident angle θ of the illumination light L2 satisfies a relationship of θ>θ$_c$ in relation to the critical angle θ$_c$. As illustrated in (a) in FIG. 16, an observation shows that illumination by the evanescent light L3 is point illumination with a small illumination area.

Figure 17:
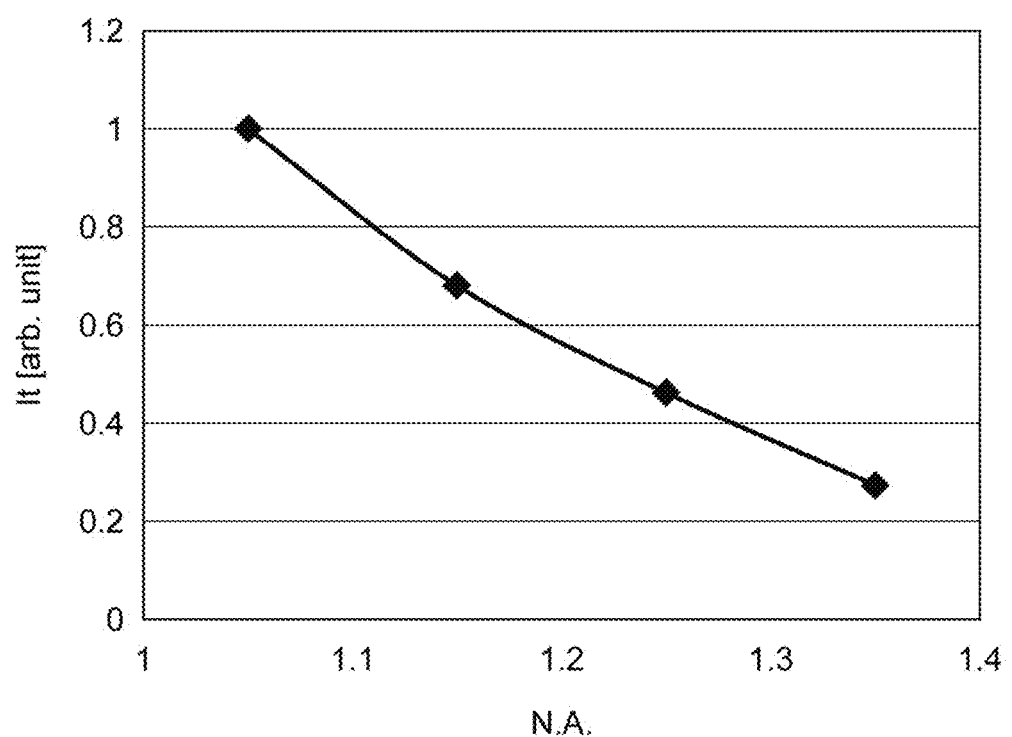
FIG. 17 is a diagram illustrating N.A. value dependency of a light intensity of evanescent light.

With point illumination in the annular-shaped convergence mode, operation of a radius size of the converging ring F2 results in the desired penetration length d or light intensity it of the evanescent light L3. FIG. 17 is a diagram illustrating N.A. value dependency of the light intensity It of the evanescent light L3. In FIG. 17, the magnitude of the light intensity It on the vertical axis is normalized and is represented in an arbitrary unit.

Similarly to the case of plane illumination, when the N.A. value is larger, namely, when the incident angle θ of the illumination light L2 is larger as compared to the critical angle θ$_c$, the light intensity It monotonically decreases, inversely, it is shown that, when the incident angle θ is closer to the critical angle θ$_c$, the light intensity It on the object mounting surface 6b increases. This means that the light intensity It of the evanescent light L3 increases as a radius of the converging ring F2 gradually decreases while approaching a region corresponding to the critical angle θ$_c$. Similarly for the penetration length d, the penetration length d becomes longer as the radius of the converging ring P2 gradually decreases while approaching the region corresponding to the critical angle θ$_c$.

That is, the larger the radius of the converging ring F2 is, the lower the light intensity It of the evanescent light L3 is, and correspondingly, the penetration length d becomes shorter. Inversely, the smaller the radius of the converging ring F2 is, the higher the light intensity It of the evanescent light L3 is, and correspondingly, the penetration length d becomes larger. Depending on a state of the object 8, it may be preferable that the light intensity It of the evanescent light L3 is not the maximum value, and in this case, operation of a radius of the converging ring P2 allows for changing the N.A. value and thereby resulting in the desired light intensity It or penetration length d.

Note that, in order to cause the illumination light L2 to converge into an annular shape, there are means other than presenting the toroidal-Fresnel lens pattern P4 on the spatial light modulator 4, such as, for example, providing a mask on the spatial light modulator 4 in such a manner to cause the illumination light L2 to converge into an annular shape. Further, there is a means to cause the illumination light L2 to be diffracted by the spatial light modulator 4 in such a manner to cause the illumination light L2 to converge into an annular shape.

Figure 18:
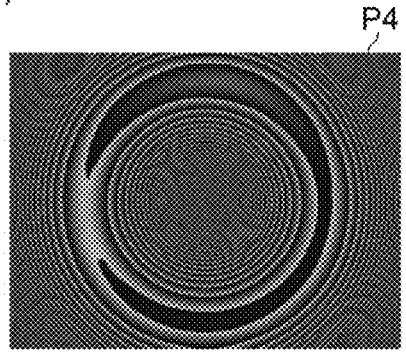
FIG. 18 includes (a)-(f) diagrams describing beam shaping of evanescent light in point illumination in the annular-shaped convergence mode.
Figure 18:
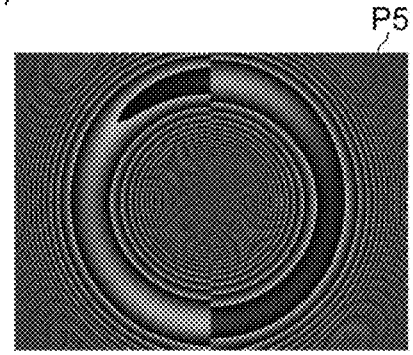
Figure 18:
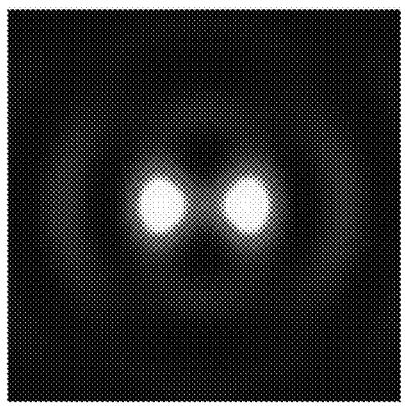
Figure 18:
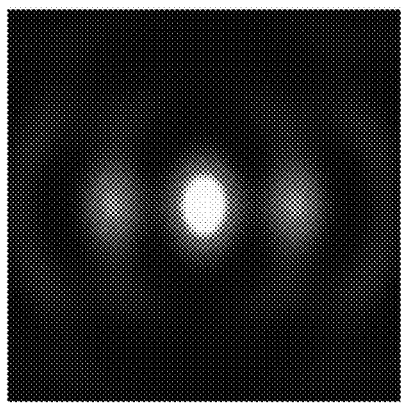
Figure 18:
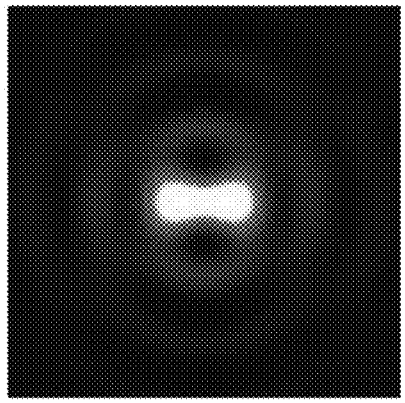
Figure 18:
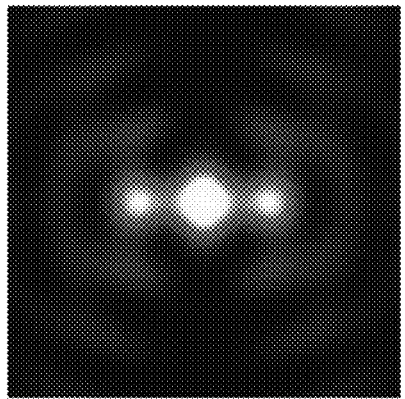

(a) to (f) in FIG. 18 are diagrams describing beam shaping of the evanescent light L3 in point illumination in the annular-shaped convergence mode. (a) in FIG. 18 is the toroidal-Fresnel lens pattern P4 in FIG. 15, and (b) and (c) in FIG. 18 illustrate observation results of the evanescent light L3 when the toroidal-Fresnel lens pattern P4 in (a) in FIG. 18 is used. (d) in FIG. 18 is a diagram illustrating a toroidal-Fresnel lens pattern P5 of a variation of (a) in FIG. 18. (e) and (f) in FIG. 18 illustrate observation results of the evanescent light L3 when the toroidal-Fresnel lens pattern P5 in (d) in FIG. 18 is used.

(b) and (e) in FIG. 18 illustrate observation results of the evanescent light L3 when the N.A. value is within 1.05 to 1.06. (c) and (f) in FIG. 18 illustrate observation results of the evanescent light L3 when the N.A. value is within 1.35 to 1.36. With point illumination in the annular-shaped convergence mode, minute observation allows for observation of a plurality of beams as the evanescent light L3. Therefore, in (b) and (c) in FIG. 18, two light condensing spots are observed while in (e) and (f) in FIG. 18, three light condensing spots are observed.

In (b) and (c) in FIG. 18, a beam shape of the evanescent light L3 is observed as distorted with left-right asymmetry. A light electric field distribution of the evanescent light L3 is dependent on a polarization direction of the illumination light L2 incident on the object substrate 6, and for example, when the illumination light L2 with linear polarization is used, a shape of the light electric field distribution of the evanescent light L3 is elongated toward the polarization direction of the illumination light L2. Therefore, when the evanescent light L3 the beam shape thereof is elongated toward the polarization direction of the illumination light L2 illuminates the object 8, an observed image of the object 8 is imaged while elongated toward the polarization direction of the illumination light L2.

When the illumination light L2 having a left-right symmetrical polarization state is used, the distortion of the spot shape of the evanescent light L3 is reduced. In the toroidal-Fresnel lens pattern P5 in (d) in FIG. 18, a half region of the pattern in (a) in FIG. 18 is added with a pattern phase-shifted by π (rad). As a result, the illumination light L2 having a left-right symmetrical polarization state is generated and thus spot shapes of the evanescent light L3 in (e) and (f) in FIG. 18 are adjusted as compared to (b) and (c) in FIG. 18, respectively.

In this manner, with point illumination in the annular-shaped convergence mode, using the toroidal-Fresnel lens pattern P5 that generates the illumination light L2 having a left-right symmetrical polarization state results in reduction of distortion in the light electric field distribution of the evanescent light L3 and an improved spot shape. Further, reference to (b) and (c) in FIG. 18 and (e) and (f) in FIG. 18 shows that the larger N.A. value provides a smaller interval between spots of the evanescent light L3.

Figure 19:
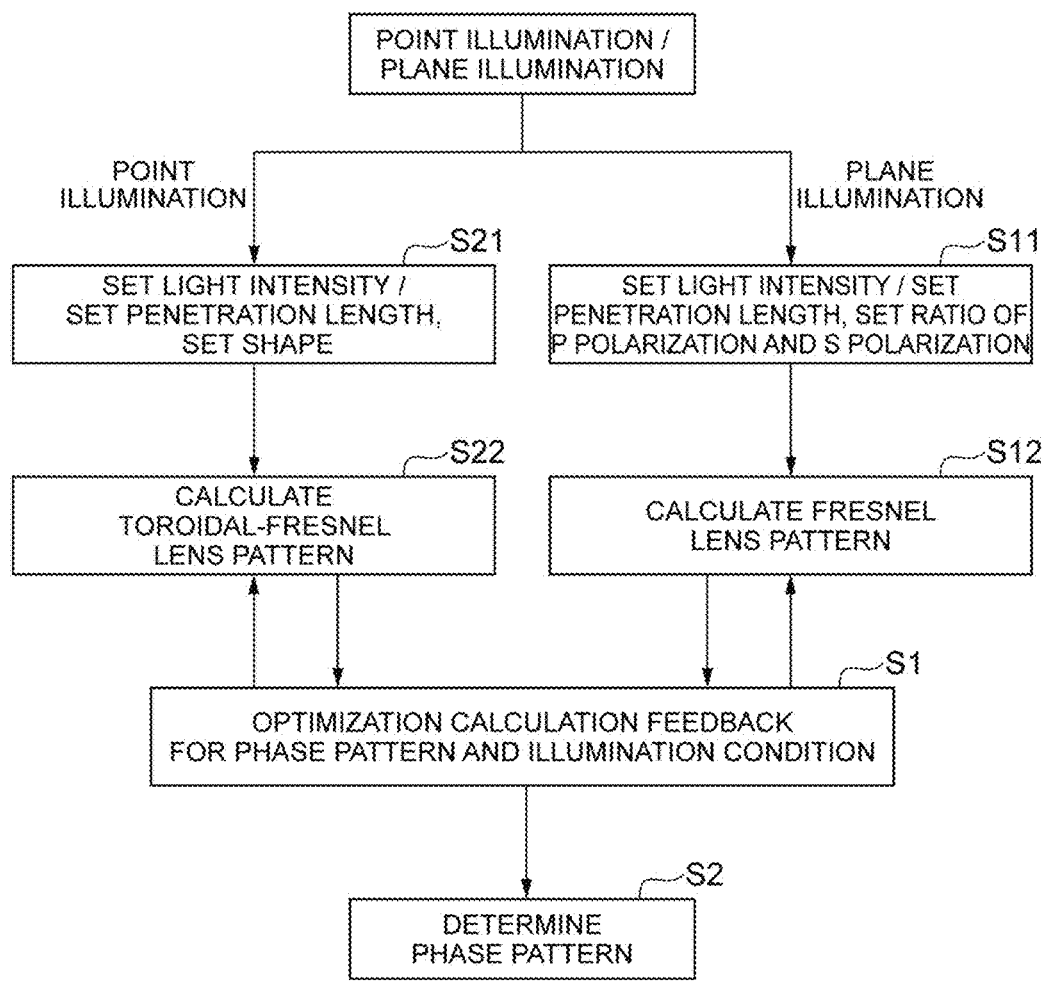
FIG. 19 is a diagram illustrating decision procedures of the Fresnel lens pattern in plane illumination and point illumination.

FIG. 19 is a diagram illustrating determination procedures of the Fresnel lens pattern for plane illumination and point illumination. In the total internal reflection light illumination apparatus 1, the calculation unit 41 calculates a Fresnel lens pattern and performs feedback according to desired illumination conditions for each of plane illumination and point illumination and determines a phase pattern. A Fresnel lens pattern based on the determined phase pattern is presented on the spatial light modulator 4 by the electronic command from the calculation unit 41.

With plane illumination, the phase pattern is determined such that the illumination light L2 converges into a point shape on the pupil plane 9. Moreover, the desired light intensity it or penetration length d of the evanescent light L3 is set according to a state of the object 8 such as thickness, concentration, and the like, and further, a ratio of P-polarization and S-polarization of the evanescent light L3 is set according to polarization dependency of the object 8 (step S11). Based on the illumination conditions having been set, the calculation unit 41 calculates the Fresnel lens pattern (step S12) through an optimization calculation feedback for the phase pattern and illumination conditions (step S1). The phase pattern is determined after the calculation (step S2), and thereafter, the Fresnel lens pattern based on the determined phase pattern by the calculation unit 41 is presented on the spatial light modulator 4.

With point illumination, the phase pattern is determined such that the illumination light L2 converges into an annular shape on the pupil plane 9. Moreover, the desired light intensity it, penetration length d, or shape of the evanescent light 13 is set according to the state of the object 8 such as thickness, concentration, and the like (step S21). Based on the illumination conditions having been set, the calculation unit 41 calculates the toroidal-Fresnel lens pattern (step S22) through the optimization calculation feedback for the phase pattern and illumination conditions (step S1). The phase pattern is determined after the calculation (step S2), and thereafter, the toroidal-Fresnel lens pattern based on the determined phase pattern by the calculation unit 41 is presented on the spatial light modulator 4.

Effects obtained by the total internal reflection light illumination apparatus 1 of the present embodiment will be described. As described above, in the total internal reflection light illumination apparatus 1 for illuminating the object 8 with the evanescent light L3, when the illumination light L2 is caused to converge on the pupil plane 9 of the objective lens 5, changing a converging shape or converging position result in a significant change in the polarization state, penetration length, shape, or light intensity of the evanescent light L3. Moreover, in this total internal reflection light illumination apparatus 1, an electronic command from the calculation unit 41 causes the Fresnel lens pattern P1 to be displayed on the spatial light modulator 4, and thus the converging shape or converging position on the pupil plane 9 of the objective lens 5 can easily be changed.

Therefore, for example, evanescent light L3 having desired polarization from among P polarization and S polarization can be obtained according to polarization dependency of the object 8. Furthermore, the evanescent light L3 having the desired penetration length, shape, or light intensity can be obtained according to the state of the object 8 such as thickness, concentration, or the like. In this manner, the total internal reflection light illumination apparatus 1 allows for easy operation of polarization state, penetration length, shape, and light intensity of the evanescent light L3 with a simple configuration.

Moreover, in the total internal reflection light illumination apparatus 1 of the present embodiment, the calculation unit 41 may generate and provide, to the spatial light modulator 4, the Fresnel lens pattern P1 corresponding to at least one of the desired polarization state, desired penetration length, desired shape, and desired light intensity of the evanescent light L3.

In this case, the Fresnel lens pattern P1 that changes a converging shape or converging position on the pupil plane 9 of the objective lens 5 is generated on the spatial light modulator 4 by an electronic command from the calculation unit 41. Therefore, for example, the evanescent light L3 having desired polarization from among P polarization and S polarization can be obtained according to polarization dependency of the object 8. Furthermore, the evanescent light L3 having the desired penetration length, shape, or light intensity can be obtained according to the state of the object 8 such as thickness, concentration, or the like.

Further, in the total internal reflection light illumination apparatus 1 of the present embodiment, the calculation unit 41 may select and provide, to the spatial light modulator 4, one Fresnel lens pattern P1 corresponding to at least one of the desired polarization state, the desired penetration length, the desired shape, and the desired light intensity of the evanescent light L3 from among a plurality of Fresnel lens patterns P1, having been prepared in advance, corresponding to at least one of a polarization state, penetration length, shape, and light intensity of the evanescent light L3.

In this case, the plurality of Fresnel lens patterns P1 respectively corresponding to at least one of a polarization state, penetration length, shape, and light intensity of the evanescent light L3 are prepared in advance. From among the Fresnel lens patterns P1 having been prepared in advance, a desired pattern is selected by the electronic command from the calculation unit 41. For example, the Fresnel lens pattern P1 that results in the evanescent light L3 having desired polarization from among P polarization and S polarization is selected according to polarization dependency of the object 8. Furthermore, the Fresnel lens patterns P1 that results in the evanescent light L3 having the desired penetration length, shape, or light intensity is selected according to the state of the object 8 such as thickness, concentration, or the like.

Moreover, the Fresnel lens pattern P1 may be a pattern allowing the incidence plane Q2 including the optical axis of the illumination light L2 incident on the object surface of the object 8 and the reference plane Q1 perpendicular to the pupil plane 9 to form the angle α corresponding to the desired polarization state of the evanescent light L3. The angle α formed by the incidence plane Q2 including the optical axis of the illumination light L2 incident on the object surface and the reference plane Q1 perpendicular to the pupil plane 9 uniquely corresponds to a polarization state of the illumination light L2. Therefore, polarized components of the evanescent light L3 can be easily operated by changing the angle α.

Further, in the total internal reflection light illumination apparatus 1 of the present embodiment, the Fresnel lens pattern P1 may be a pattern allowing a distance between a converging position of the illumination light L2 on the pupil plane 9 and a center position of the pupil plane 9 to correspond to the desired penetration length or the desired light intensity of the evanescent light L3. Changing the distance between the converging position of the illumination light L2 on the pupil plane 9 and the center position of the pupil plane results in a change of relationship between the incident angle θ of the illumination light L2 and the critical angle $θ_c$ upon total reflection of the illumination light L2. The relationship between the incident angle θ of the illumination light L2 and the critical angle $θ_c$ is related to a penetration length and light intensity of the evanescent light L3. Therefore, by operating the distance between the converging position of the illumination light L2 on the pupil plane 9 and the center position of the pupil plane 9, the desired penetration length and light intensity of the evanescent light L3 can be easily obtained.

Furthermore, in the total internal reflection light illumination apparatus 1 of the present embodiment, the Fresnel lens pattern P1 may be a pattern allowing the illumination light L2 to converge into a point shape on the pupil plane 9. The evanescent light L3 generated by this Fresnel lens pattern P1 can illuminate a wider area of the object 8 as compared to the annular-shaped convergence mode.

Furthermore, in the total internal reflection light illumination apparatus 1 of the present embodiment, the Fresnel lens pattern P1 may be a pattern allowing the illumination light L2 to converge into an annular shape on the pupil plane 9. The evanescent light L3 generated by this Fresnel lens pattern P1 illuminates the object 8 in point-shaped manner and thus can illuminate a minute region in a concentrated manner.

Further, the total internal reflection light illumination apparatus 1 of the present embodiment may allow for selecting one of a point shape or an annular shape as a mode of convergence of the illumination light L2 on the pupil plane 9. This allows the illumination area for the object 8 to be freely changed by the operator.

The total internal reflection light illumination apparatus of the present invention has been described in detail in the above, however, the total internal reflection light illumination apparatus of the present invention is not limited to the above-described embodiments but may include other various modifications. For example, the apparatus can be employed not only to a total internal reflection microscope but also to, for example, surface processing using evanescent light. Since a penetration length or light intensity of the evanescent light can be operated, a surface with a preferable accuracy can be provided.

Further, the object has been described as the object 8 placed on the object mounting surface 6b, however, evanescent light may be generated inside the object by subjecting the illumination light to total reflection on a surface of the object. For example, in a semiconductor device such as a semiconductor integrated circuit, a substrate of the semiconductor device plays a role as the object substrate and thus allows evanescent light generated near the substrate of the semiconductor device to illuminate a device surface (corresponding to the object 8) of the semiconductor device.

Furthermore, the liquid immersion lens method where the immersion oil 7 is provided between the objective lens 5 and object substrate 6 has been described, however, a solid immersion lens having a refractive index equivalent to that of the object substrate 6 may be provided on the object substrate 6. This is effective when using liquid is difficult with the object such as a semiconductor device.

The total internal reflection light illumination apparatus according to the present embodiment generates evanescent light by illuminating an object with light, and the total internal reflection light illumination apparatus includes a light source for providing illumination light; a spatial light modulator for condensing and outputting the illumination light by receiving input of the illumination light and presenting a lens pattern; an objective lens for irradiating the object with the light by irradiating an object surface with the illumination light condensed and output by the spatial light modulator and thereby causing total reflection; and a calculation unit for providing, to the spatial light modulator, the lens pattern corresponding to at least one of a desired polarization state, desired penetration length, desired shape, and desired light intensity of the evanescent light, and the lens pattern is a pattern which condenses the illumination light on a pupil plane of the objective lens.

Moreover, in the total internal reflection light illumination apparatus, the calculation unit may generate and provide, to the spatial light modulator, the lens pattern corresponding to at least one of the desired polarization state, desired penetration length, desired shape, and desired light intensity of the evanescent light.

In this total internal reflection light illumination apparatus, the lens pattern that changes a converging shape or converging position on the pupil plane of the objective lens is generated on the spatial light modulator by an electronic command from the calculation unit. Therefore, for example, the evanescent light having a desired polarization from among P polarization and S polarization can be obtained according to polarization dependency of the object. Furthermore, the evanescent light having a desired penetration length, shape, or light intensity can be obtained according to the state of the object such as thickness, concentration, and the like.

Further, in the total internal reflection light illumination apparatus, the calculation unit may select and provide, to the spatial light modulator, the one lens pattern based on at least one of the desired polarization state, the desired penetration length, the desired shape, and the desired light intensity of the evanescent light, from among a plurality of lens patterns having been prepared in advance and corresponding to at least one of a polarization state, penetration length, shape, and light intensity of the evanescent light.

In this total internal reflection light illumination apparatus, the plurality of lens patterns corresponding to at least one of a polarization state, penetration length, shape, and light intensity of the evanescent light are prepared in advance. From among the lens patterns having been prepared in advance, a desired pattern is selected by the electronic command from the calculation unit. For example, the lens pattern that results in the evanescent light having a desired polarization from among P polarization and S polarization is selected according to polarization dependency of the object. Furthermore, the lens pattern that results in the evanescent light having a desired penetration length, shape, or light intensity is selected according to the state of the object such as thickness, concentration, and the like.

Moreover, the lens pattern may be configured as a pattern for allowing the incidence plane including the optical axis of the illumination light incident on the object surface and the reference plane perpendicular to the pupil plane to form an angle corresponding to the desired polarization state of the evanescent light.

According to knowledge of the present inventors, the angle formed by the incidence plane including the optical axis of the illumination light incident on the object surface and the reference plane perpendicular to the pupil plane uniquely corresponds to a polarization state of the illumination light. Therefore, polarized components of the evanescent light can be easily operated by changing the angle.

Further, the total internal reflection light illumination apparatus may be configured such that the lens pattern is a pattern for allowing a distance between a converging position of the illumination light on the pupil plane and a center position of the pupil plane to correspond to the desired penetration length or the desired light intensity of the evanescent light.

Changing the distance between the converging position of the illumination light on the pupil plane and the center position of the pupil plane results in a change of relationship between the incident angle of the illumination light and the critical angle upon total reflection of the illumination light. The relationship between the incident angle of the illumination light and the critical angle is related to a penetration length and light intensity of the evanescent light. Therefore, by operating the distance between the converging position of the illumination light on the pupil plane and the center position of the pupil plane, the desired penetration length and light intensity of the evanescent light can be easily obtained.

Furthermore, the total internal reflection light illumination apparatus may be configured such that the lens pattern is a pattern for allowing the illumination light to converge into a point shape on the pupil plane. The evanescent light generated by this lens pattern can illuminate a wider area of the object as compared to the annular-shaped convergence mode, which will be described later.

Furthermore, the total internal reflection light illumination apparatus may be configured such that the lens pattern is a pattern for allowing the illumination light to converge into an annular shape on the pupil plane. The evanescent light generated by this lens pattern illuminates the object in point-shaped manner and thus can illuminate a minute region in a concentrated manner.

Further, the total internal reflection light illumination apparatus may be configured to select one of a point shape or an annular shape as a mode of convergence of the illumination light on the pupil plane. This allows the illumination area of the object to be freely changed by the operator.

INDUSTRIAL APPLICABILITY

The present invention can be used as a total reflection type light illumination apparatus capable of easily operating polarization state, penetration length, shape, and light intensity of evanescent light with a simple configuration.

REFERENCE SIGNS LIST

1—total internal reflection light illumination apparatus, 2—light source, 3—condensing lens, 4—spatial light modulator, 5—objective lens, 6—object substrate, 7—immersion oil, 8—object, 9—pupil plane, 41 calculation unit, L1, L2—illumination light, L3—evanescent light, F1—converging point, F2—converging ring, P1—lens pattern.

The invention claimed is:

1. An apparatus for generating evanescent light by illuminating an object with light, the apparatus comprising:
a light source configured to output illumination light;
a spatial light modulator configured to input the illumination light, and modulate the illumination light by a lens pattern;
an objective lens configured to illuminate an object surface with the modulated illumination light and thereby causing total reflection; and
a calculator electrically coupled to the spatial light modulator and configured to provide, to the spatial light modulator, the lens pattern corresponding to at least one of a desired polarization state, desired penetration length, desired shape, and desired light intensity of the evanescent light, wherein
the lens pattern is a pattern for converging the illumination light on a pupil plane of the objective lens.

2. The apparatus according to claim 1, wherein
the calculator generates the lens pattern corresponding to at least one of the desired polarization state, the desired penetration length, the desired shape, and the desired light intensity of the evanescent light.

3. The apparatus according to claim 1, wherein
the calculator selects the lens pattern based on at least one of the desired polarization state, the desired penetration length, the desired shape, and the desired light intensity of the evanescent light, from among a plurality of lens patterns having been prepared in advance and corresponding to at least one of a polarization state, penetration length, shape, and light intensity of the evanescent light.

4. The apparatus according to claim 1, wherein
the lens pattern is a pattern for allowing an incidence plane including an optical axis of the illumination light incident on the object surface and a reference plane perpendicular to the pupil plane to form an angle corresponding to the desired polarization state of the evanescent light.

5. The apparatus according to claim 1, wherein
the lens pattern is a pattern for allowing a distance between a converging position of the illumination light on the pupil plane and a center position of the pupil plane to correspond to the desired penetration length or the desired light intensity of the evanescent light.

6. The apparatus according to claim 1, wherein
the lens pattern is a pattern for allowing the illumination light to converge into a point shape on the pupil plane.

7. The apparatus according to claim 1, wherein
the lens pattern is a pattern for allowing the illumination light to converge into an annular shape on the pupil plane.

8. The apparatus according to claim 1, wherein
as a mode of convergence of the illumination light on the pupil plane, one of a point shape or an annular shape is selected.

9. A method for generating evanescent light by illuminating an object with light, the method comprising:
  modulating illumination light by a spatial light modulator with a lens pattern;
  illuminating an object surface with the modulated illumination light by an objective lens and thereby causing total reflection; and
  providing, to the spatial light modulator, the lens pattern corresponding to at least one of a desired polarization state, desired penetration length, desired shape, and desired light intensity of the evanescent light, wherein
  the lens pattern is a pattern for converging the illumination light on a pupil plane of the objective lens.

10. The method according to claim 9, further comprising:
  generating the lens pattern corresponding to at least one of the desired polarization state, the desired penetration length, the desired shape, and the desired light intensity of the evanescent light.

11. The method according to claim 9, further comprising:
  selecting the lens pattern based on at least one of the desired polarization state, the desired penetration length, the desired shape, and the desired light intensity of the evanescent light, from among a plurality of lens patterns having been prepared in advance and corresponding to at least one of a polarization state, penetration length, shape, and light intensity of the evanescent light.

12. The method according to claim 9, wherein
  the lens pattern is a pattern for allowing an incidence plane including an optical axis of the illumination light incident on the object surface and a reference plane perpendicular to the pupil plane to form an angle corresponding to the desired polarization state of the evanescent light.

13. The method according to claim 9, wherein
  the lens pattern is a pattern for allowing a distance between a converging position of the illumination light on the pupil plane and a center position of the pupil plane to correspond to the desired penetration length or the desired light intensity of the evanescent light.

14. The method according to claim 9, wherein
  the lens pattern is a pattern for allowing the illumination light to converge into a point shape on the pupil plane.

15. The method according to claim 9, wherein
  the lens pattern is a pattern for allowing the illumination light to converge into an annular shape on the pupil plane.

16. The method according to claim 9, wherein
  as a mode of convergence of the illumination light on the pupil plane, one of a point shape or an annular shape is selected.

* * * * *